(12) United States Patent
Takematsu et al.

(10) Patent No.: US 9,517,888 B2
(45) Date of Patent: Dec. 13, 2016

(54) ENDLESS BELT AND IMAGE HEATING APPARATUS INCLUDING THE ENDLESS BELT

(71) Applicant: CANON KABUSHIKI KAISHA, Tokyo (JP)

(72) Inventors: Koji Takematsu, Abiko (JP); Tomohiko Yoshimura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 14/263,060

(22) Filed: Apr. 28, 2014

(65) Prior Publication Data

US 2014/0318931 A1 Oct. 30, 2014

(30) Foreign Application Priority Data

Apr. 30, 2013 (JP) .................................. 2013-095193
Feb. 17, 2014 (JP) .................................. 2014-027560

(51) Int. Cl.
G03G 15/20 (2006.01)
B65G 15/60 (2006.01)

(52) U.S. Cl.
CPC ........... B65G 15/60 (2013.01); G03G 15/2053 (2013.01); *G03G 2215/2035* (2013.01)

(58) Field of Classification Search
CPC ............................ G03G 15/2053; B65G 15/60
See application file for complete search history.

(56) References Cited

U.S. PATENT DOCUMENTS

| 7,199,339 | B2 | 4/2007 | Shirakata et al. |
| 7,271,371 | B2 | 9/2007 | Takematsu et al. |
| 7,319,210 | B2 | 1/2008 | Hosoi et al. |
| 7,397,017 | B2 | 7/2008 | Hosoi et al. |
| 7,442,905 | B2 | 10/2008 | Wakahara et al. |
| 7,462,804 | B2 | 12/2008 | Shirakata et al. |
| 7,465,906 | B2 | 12/2008 | Wakahara et al. |
| 7,657,217 | B2 | 2/2010 | Wakahara et al. |
| 2005/0185994 | A1* | 8/2005 | Inada et al. .................... 399/328 |
| 2011/0299900 | A1* | 12/2011 | Yonekawa et al. ........... 399/329 |
| 2012/0328338 | A1 | 12/2012 | Nawa et al. |
| 2012/0328342 | A1 | 12/2012 | Takematsu et al. |
| 2013/0064587 | A1* | 3/2013 | Jeong ................. G03G 15/2039 399/329 |
| 2013/0094887 | A1 | 4/2013 | Nawa et al. |
| 2013/0279926 | A1 | 10/2013 | Yoshimura |

FOREIGN PATENT DOCUMENTS

JP 2009-092785 A 4/2009

* cited by examiner

*Primary Examiner* — David Gray
*Assistant Examiner* — Thomas Giampaolo, II
(74) *Attorney, Agent, or Firm* — Fitzpatrick, Cella, Harper & Scinto

(57) ABSTRACT

An endless belt for heating an image on a sheet includes a resistance layer for generating heat by the supply of electric power; a first ring member provided in a widthwise end side of the endless belt so as to be electrically connected with the resistance layer; a second ring member, one of the first and second ring members being fitted around the other with the resistance layer sandwiched therebetween; and a fixing member configured to fix the first and second ring members to each other so that the first and second ring members are rotated integrally with the resistance layer.

37 Claims, 18 Drawing Sheets (a)

(b)

(a)

(b)

(c)

ENDLESS BELT AND IMAGE HEATING APPARATUS INCLUDING THE ENDLESS BELT

FIELD OF THE INVENTION AND RELATED ART

The present invention relates to an endless belt for heating an image on a sheet and an image heating apparatus including an endless belt.

In a conventional image forming apparatus of an electrophotographic type, a toner image is formed on the sheet and then heated and pressed by fixing device (image heating apparatus), so that fixing of the image is performed.

As the fixing device, in recent years, from the viewpoint of energy saving, as a type in which the heat transmission efficiency is high and rise of the fixing device is quick, a type using a heating belt including a heat generating resistor has been proposed (Japanese Laid-Open Patent Application (JP-A) 2009-92785).

In this fixing device, a heating belt, prepared by laminating a heat generating resistance layer on a cylindrical insulative base material and by laminating an electrode layer on the heat generating resistance layer in each of widthwise end sides, is employed. Then, an electric power supply member formed with a carbon chip or the like supplies electric power to the heat generating resistance layer while sliding with the electrode layer to cause the heat generating resistance layer to generate heat, so that the entire heating belt is heated.

However, the above-described fixing device, a constitution in which the electric power is supplied while the electric power supply member is slid on the electrode layer of the heating belt is employed, and therefore the electrode layer of the heating belt is gradually abraded with use thereof. As a result, such a situation that the heating belt has to be frequently replaced, due to the abrasion of the electrode layer of the heating belt, can occur.

SUMMARY OF THE INVENTION

According to an aspect of the present invention, there is provided an endless belt for heating an image on a sheet, comprising: a resistance layer for generating heat by supply of electric power; a first ring member provided in a widthwise end side of the endless belt so as to be electrically connected with the resistance layer; and a second ring member. One of the first and second ring members is fitted around the other with the resistance layer sandwiched therebetween. The belt also comprises a fixing member configured to fix the first and second ring member to each other so that the first and second ring members are rotated integrally with the resistance layer.

According to another aspect of the present invention, there is provided an endless belt for heating an image on a sheet. The belt includes a resistance layer for generating heat by supply of electric power, a ring member provided with a bottom and a hollow portion into which a widthwise end of the endless belt is inserted so as to be electrically connected with the resistance layer, and a fixing member configured to fix the ring member so that the ring member is rotated integrally with the resistance layer.

According to a further aspect of the present invention, there is provided an image heating apparatus comprising: (i) an endless belt for heating an image on a sheet at a nip the endless belt including: (i-i) a resistance layer for generating heat by supply of electric power; (i-ii) a first ring member provided in a widthwise end side of the endless belt so as to be electrically connected with the resistance layer; and (i-iii) a second ring member. One of the first and second ring members is fitted around the other with the resistance layer sandwiched therebetween. The belt also includes: (i-iv) a first fixing member configured to fix the first and second ring member to each other so that the first and second ring members are rotated integrally with the resistance layer; (i-v) a third ring member provided in a widthwise end side of the endless belt so as to be electrically connected with the resistance layer; and (i-vi) a fourth ring member. One of the third and fourth ring members is fitted around the other with the resistance layer sandwiched therebetween. The belt further includes (i-vii) a second fixing member configured to fix the third and fourth ring member to each other so that the third and fourth ring members are rotated integrally with the resistance layer. The image heating apparatus also has: (ii) a first slidable member, provided slidably with the first ring member, configured to effect electric power supply to the resistance layer via the first ring member; (iii) a second slidable member, provided slidably with the third ring member, configured to form an electric power supply path, via the resistance layer, between the first and second slidable members; and (iv) a rotatable driving member configured to form the nip in cooperation with the endless belt and configured to rotationally drive the endless belt.

These and other objects, features and advantages of the present invention will become more apparent upon a consideration of the following description of the preferred embodiments of the present invention taken in conjunction with the accompanying drawings.

DESCRIPTION OF THE EMBODIMENTS

A fixing device as an image heating apparatus according to the present invention will be specifically described. Incidentally, in the following embodiments, with respect to various constitutions specifically described, the constitutions are replaceable with other known constitutions within the scope of a concept of the present invention.

[Embodiment 1]

Before providing a description of a fixing device F, an image forming apparatus 1 in which the fixing device F is mounted will be described.

(1) Image Forming Portion

Figure 1:
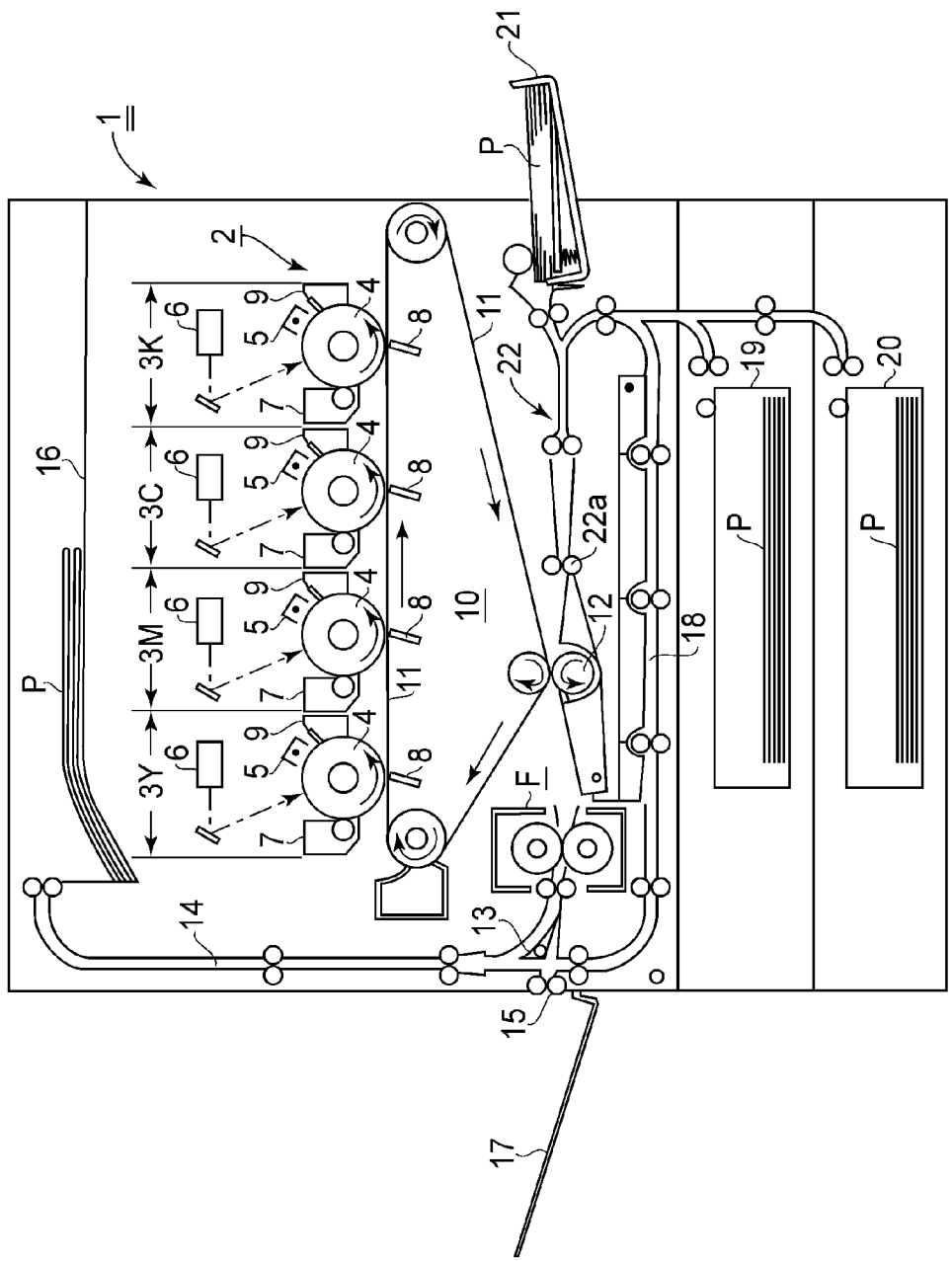
FIG. 1 is a schematic view of an image forming apparatus in Embodiment 1.

FIG. 1 is a schematic view of an example of the image forming apparatus 1. This image forming apparatus 1 is a color printer capable of forming an image, corresponding to image information inputted from a host device 200 (FIG. 2) into a control circuit portion 100, on a sheet P by using an electrophotographic technology.

The sheet P is a medium on which an image is to be formed by the image forming apparatus 1 and includes, e.g., regular or irregular plain paper, thick paper, an envelope, a postcard, a resin sheet, an OHT sheet, glossy paper, etc.

An image forming portion 2 includes four image forming stations 3Y, 3M, 3C and 3K each for forming the image on the sheet P which is fed from a cassette 19 or 20 or a multi-feeding tray 21 and which is then fed by a feeding mechanism 22 including a registration roller pair 22a. Each station includes a rotational drum-type photosensitive member 4, a charging member 5, a laser scanner 6, a developing device 7, a transfer member 8, and a photosensitive member cleaner 9. The stations 3Y, 3M, 3C and 3K form toner images of yellow, magenta, cyan and black, respectively.

Further, the image forming portion 2 includes an intermediary transfer unit 10. Respective color toner images are primary-transferred superposedly from the stations 3Y, 3M, 3C and 3K onto an intermediary transfer belt 11 to form a synthetic toner image, which is then collectively secondary-transferred onto the sheet P by a secondary transfer roller 12. An operation of the above-described image forming portion 2 and a color image forming process are well known, and therefore further description thereof will be omitted.

The sheet P on which the (unfixed) toner image formed at the image forming portion 2 is secondary-transferred is sent to the fixing device F, in which the toner image is heat-fixed. A route of the sheet P coming out of the fixing device F is switched to a first path 14 side or a second path 15 side by a flapper 13 depending on mode selection mode in advance. The sheet P introduced in the first path 14 is discharged onto a face-down tray 16 in an upper surface side of the image forming apparatus 1. The sheet P introduced in the second path 15 is discharged onto a face-up tray 17 in a side surface side of the image forming apparatus 1.

In the case of an operation in a double-side image forming mode, the sheet P, on which the image has been formed on a first surface thereof, coming out of the fixing device F is once introduced into the first path 14 and then is fed in a switch-back manner to be introduced into a third path 18. Then, the sheet P is fed again to the image forming portion 2 via the feeding mechanism 22 in an upside-down state.

(2) Fixing Device (2-1) General Structure of Fixing Device

Figure 2:
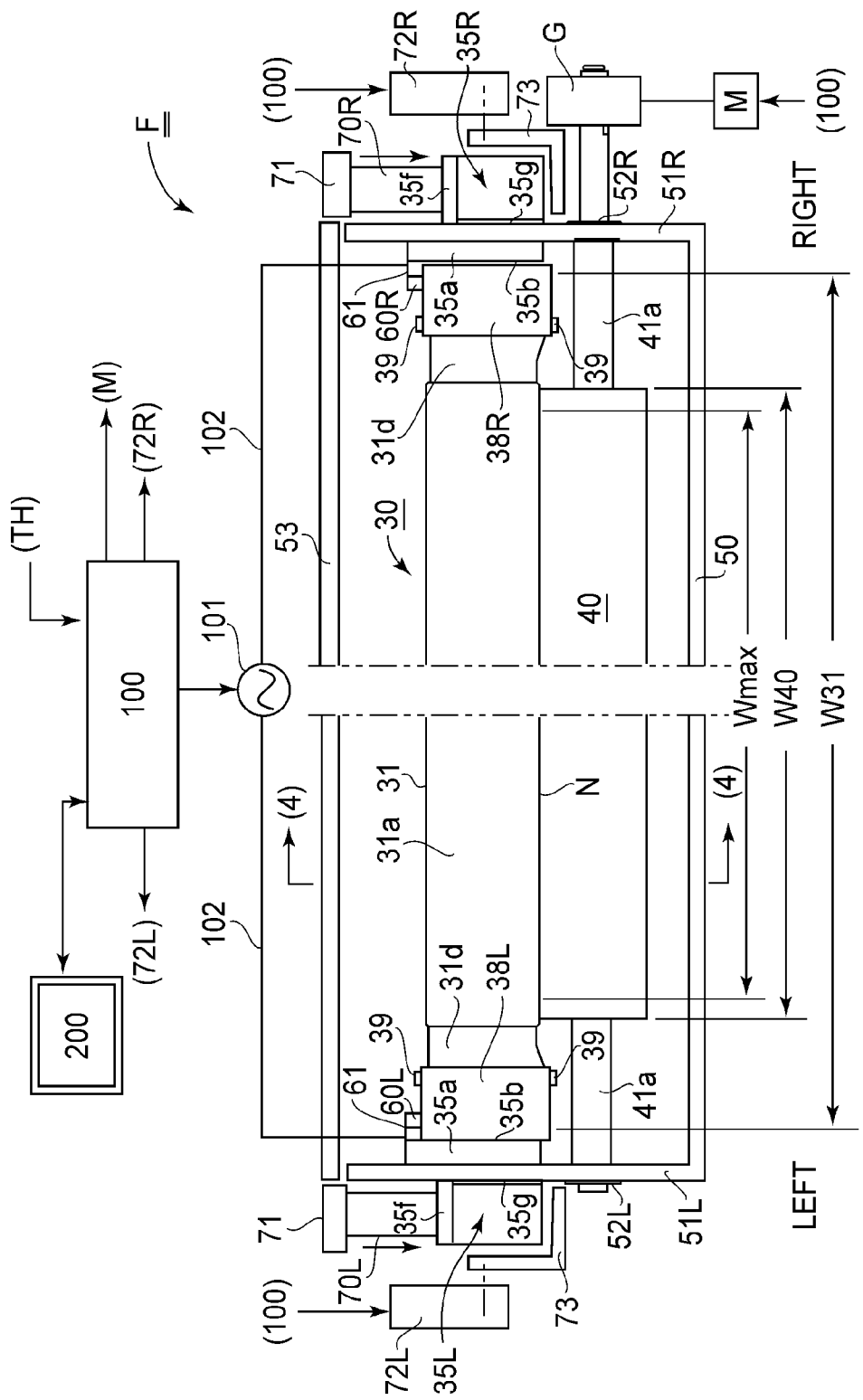
FIG. 2 is a schematic front view of a fixing device from which an intermediate portion is omitted.
Figure 3:
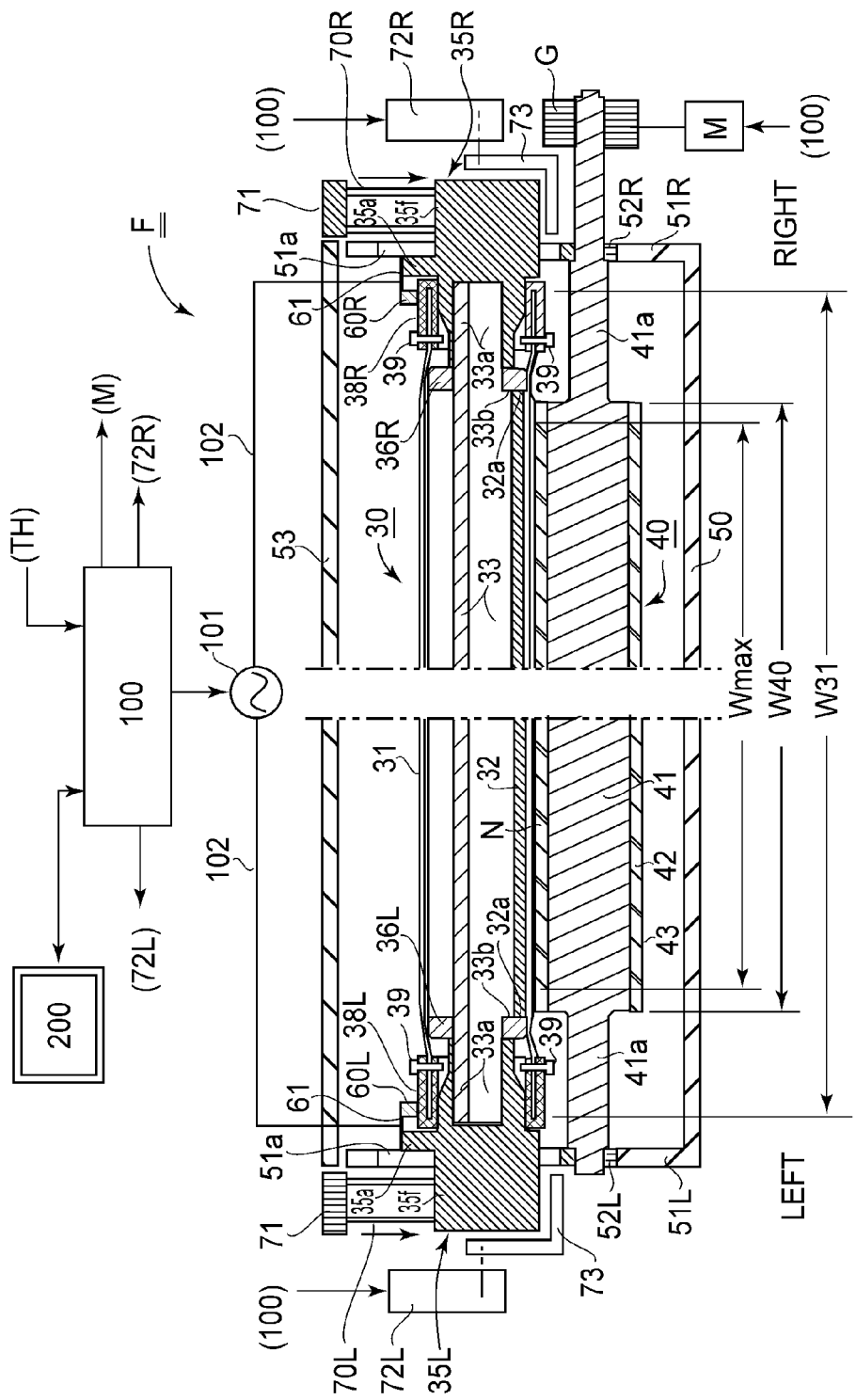
FIG. 3 is a schematic cross-sectional front view of the fixing device from which the intermediate portion is omitted.
Figure 4:
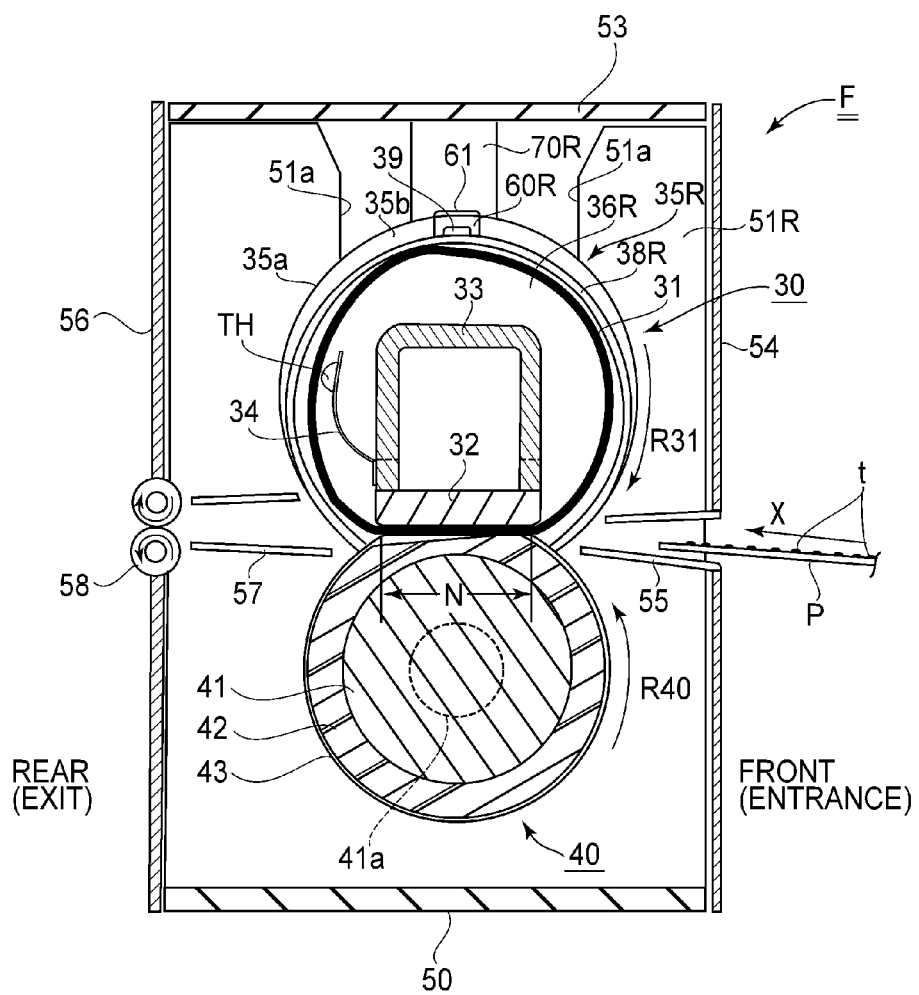
FIG. 4 is an enlarged cross-sectional view, in a left side, taken along (4)-(4) arrows indicated in FIG. 2.

The fixing device F in this embodiment is of a pressing-roller drive type (tension-less type) and a heat-generation, fixing-belt type. FIG. 2 is a schematic front view of the fixing device F from which an intermediate portion is omitted. However, a front cover plate 54 and an entrance-side guide plate 55 shown in FIG. 4 are omitted. FIG. 3 is a schematic cross-sectional front view of the fixing device F from which the intermediate portion is omitted. FIG. 4 is an enlarged cross-sectional view, in a left side, taken along (4)-(4) arrows indicated in FIG. 2.

Here, with respect to the fixing device F or its constituent members in this embodiment, a front side (surface) is a side (surface) as seen from a sheet entrance side of the fixing device F, and a rear side (surface) is an opposite side (surface) (sheet exit side) to the front side. Left and right sides are a left side (one end side or the front side) and a right side (the other end side or the rear side) when the fixing device F is seen from the front side. An upstream side and a downstream side are those with respect to a sheet feeding direction. Further, a longitudinal direction (long direction) or a sheet width direction is a direction substantially parallel to a direction perpendicular to the sheet feeding direction. A short direction is a direction substantially parallel to the sheet feeding direction in a plane of a sheet feeding path.

The fixing device F includes a belt unit 30 including an endless fixing belt (fixing member) 31 as a rotatable heating member (first rotatable member). Further, the fixing device F includes an elastic pressing roller 40 as a rotatable pressing member (second rotatable member) for forming a nip N, in cooperation with the belt 31, in which the sheet P carrying thereon the image is nip-conveyed and heated.

Figure 7:
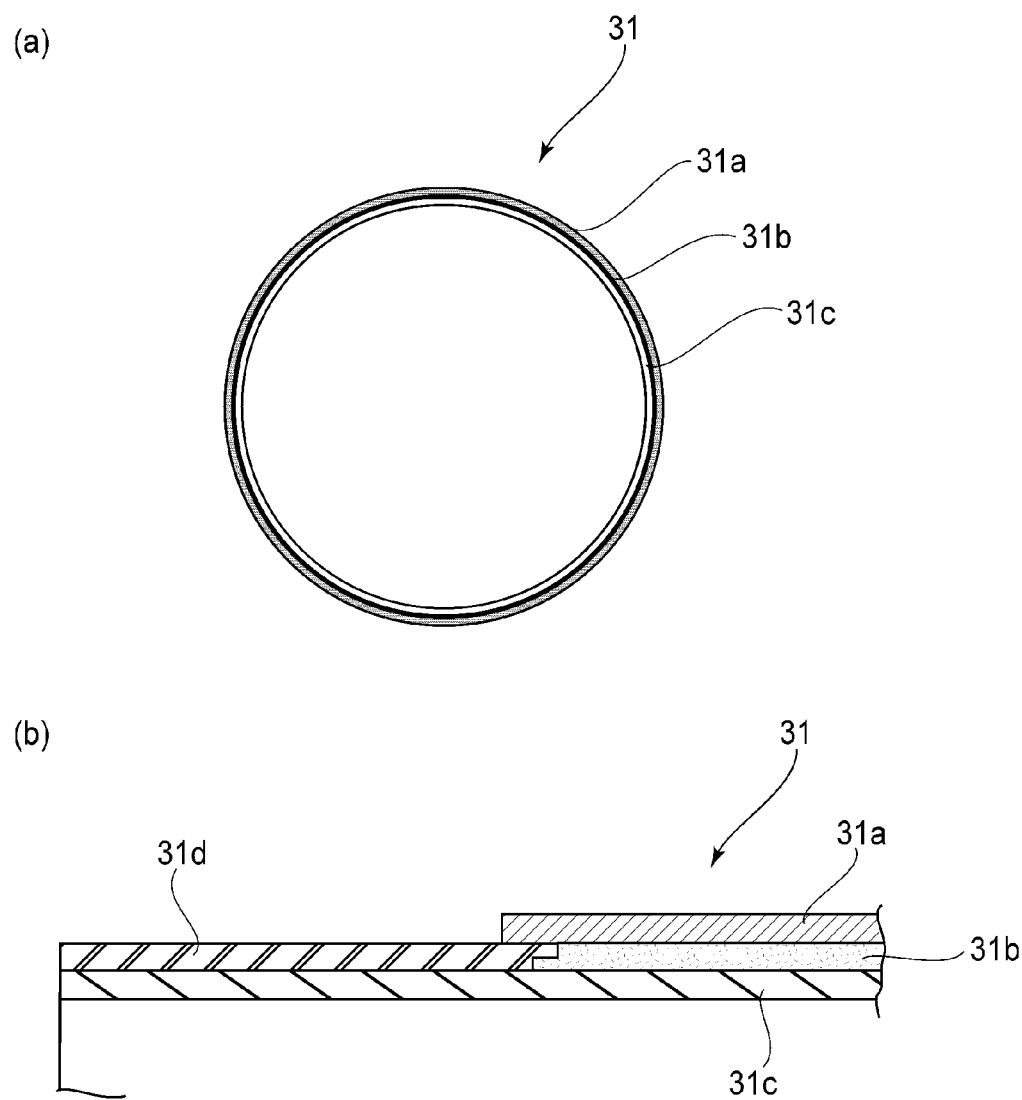
In FIG. 7, (a) and (b) are schematic views for illustrating a layer structure of a belt.
Figure 8:
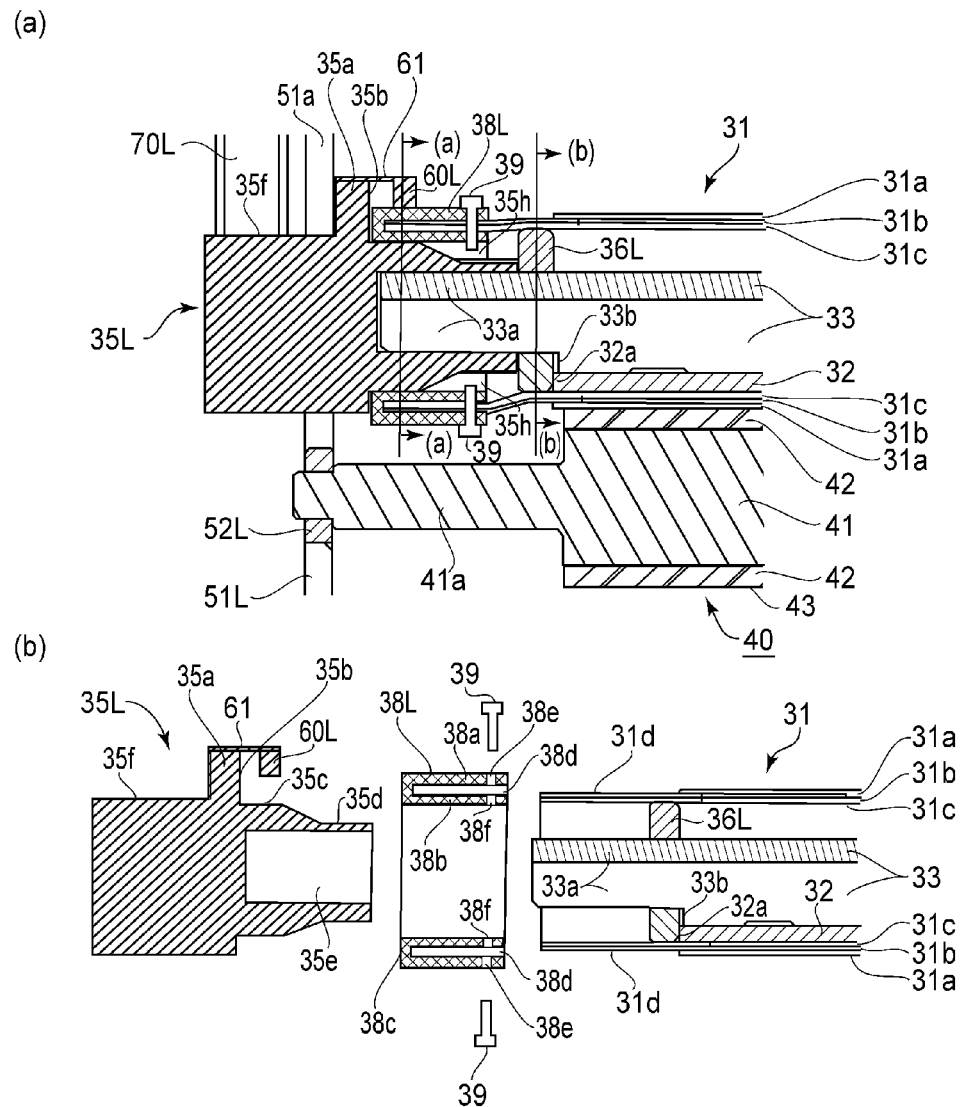
In FIG. 8, (a) is an enlarged schematic view of a left-side terminal member and its peripheral portion in the sectional view of FIG. 3, and (b) is an exploded schematic view (sectional view) of a principal part of (a).

Details of the structure of the belt 31 will be described later, but as shown in FIGS. 7 and 8, the belt 31 is a self-heat generating belt (tube heater), which is cylindrical and flexible, including a heat generating resistance layer 31b, which generates heat by electric power supply. Further, at left and right end portions of the belt 31, electric power supply rings 38L and 38R, as a ring member for supplying electric power to the heat generating resistance layer 31b, are mounted, respectively.

The belt unit 30 includes a pressing pad (nip pad) 32 as a belt supporting member (pressing member or back-up member) provided inside the belt 31 and a pressing stay 33 as a pressing pad holding member. The pad 32 is a long heat insulating member which is substantially rectangular at a cross-sectional surface and which extends in the left and right direction. The stay 33 is a long rigid member which has a downward U-shaped cross-sectional surface and which extends in the left and right direction. The stay 33 may desirably be a member which is not readily flexed even when high pressure is applied, and is mold material formed of, e.g., SUS 304. The pad 32 and stay 33 are vertically arranged in parallel and pad 32 is bonded to a leg portion of the stay 33.

The pad 32 is a pressing member which opposes the pressing roller 40 via the belt 31 and which presses the belt 31 from an inside of the belt 31 toward the pressing roller 40 and which contacts and slides on the inner surface of the belt 31 at a lower surface thereof in the nip N. The pad 32 has the function as a guide for regulating a rotational orbit of the belt 31 in the neighborhood of the nip N, and is required to have a heat resistant property and a sliding property with the inner surface of the belt.

As a material for the pad 32, it is possible to use a heat resistant resin such as a liquid crystal polymer, or ceramics or metals such as SUS. At the nip, the material such as SUS excellent in sliding property may also be used, and at the guide portion, the heat resistant resin such as the liquid crystal polymer excellent in processing property may also be used. Further, onto a sliding surface with the belt 31, heat resistant grease may also be applied.

At a substantially longitudinal central portion of the stay 33, a thermistor TH as a temperature sensor is provided via an elastic supporting member (urging means) 34 such as a leaf spring 61 as shown in FIG. 4. The belt 31 is externally fitted loosely on an assembly including the pressing pad 32, the stay 33, the elastic supporting member 34 and the thermistor TH.

The belt unit 30 includes terminal members 35L and 35R mounted in end portion sides of the above assembly. Each of the terminal members 35L and 35R limits movement of the belt 31, externally fitted loosely onto the pad 32 and the stay 33, with respect to a widthwise direction, and also has the function of guiding an inner peripheral surface of an associated end portion of the rotating belt. The terminal members 35L and 35R are bilaterally symmetrical mold members formed of a heat resistant and electrically insulating resin.

In FIG. 8, (a) is an enlarged view of a left-side terminal member 35L and its peripheral portion shown in the schematic view of FIG. 3, and (b) is an exploded view (schematic view) of a principal part of (a). Although a right-side terminal member 35R and its peripheral portion are omitted from illustration, the right-side terminal member 35R and its peripheral portion and the left-side terminal member 35L and its peripheral portion provide a substantially bilaterally symmetrical structure.

Figure 5:
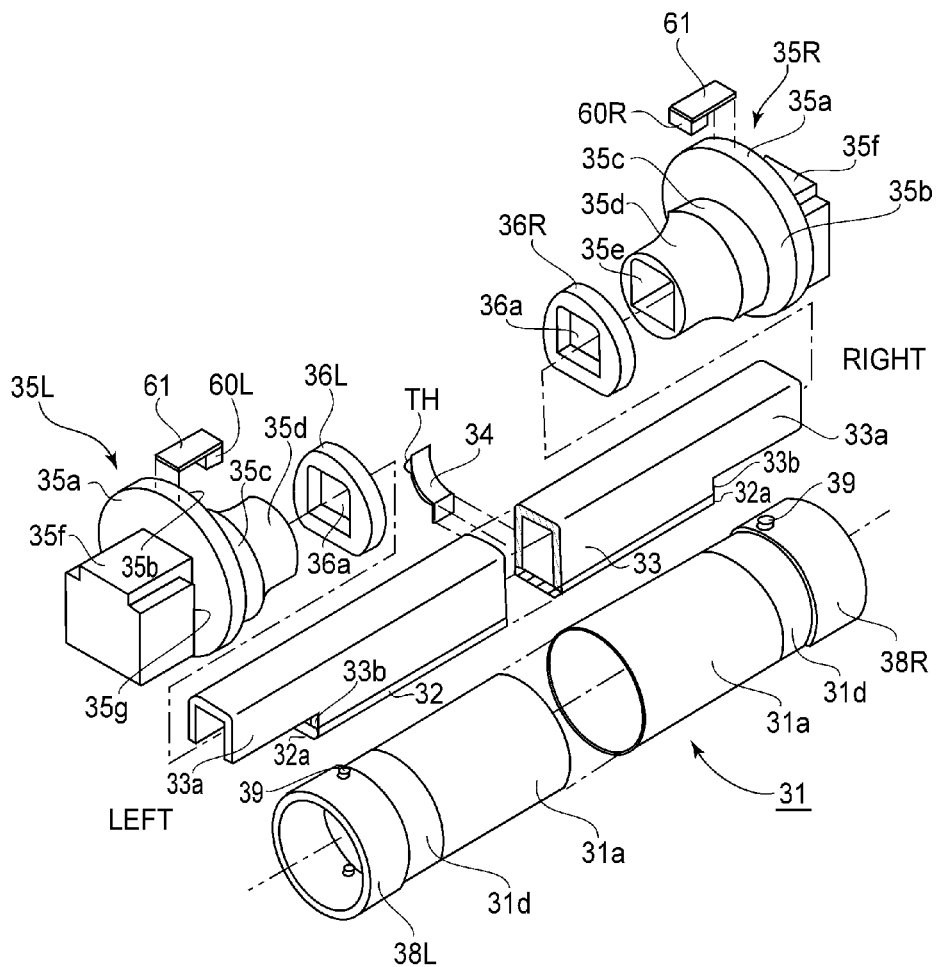
FIG. 5 is an exploded perspective view of a belt unit.

Referring to FIG. 5, each of the terminal members 35L and 35R is provided with a flange member 35a for receiving an end surface of an electric power supply ring 38L or 38R by an inside abutment surface 35b. Further, inside the flange member 35a is provided a circular first guide member 35c for guiding the inner peripheral surface of each of the electric power supply rings 38L and 38R by being engaged in the associated electric power supply ring 38L or 38R. An end of the first guide member 35c is extended to form a circular portion 35d, which is substantially coaxial with the first guide member 35c and which is smaller in outer diameter than the first guide member 35c. Inside the first guide member 35c and its extended small-outer diameter circular portion 35d of each of the terminal members 35L and 35R, a hole portion 35e, into which an associated one of left and right end portions 33a of the stay 33, is formed. Further, outside the flange member 35a, a pressure-receiving block 35f is provided. In each of the front and rear sides of the pressure-receiving block 35f, a vertical groove portion 35g (FIGS. 2 and 5) is provided at an engaging portion with the associated flange member 35a. A leg portion of each of the left and right end portions 33a of the stay 33 to be inserted into the hole portions 35e of the terminal members 35L and 35R is shorter than a longitudinal central leg portion of the stay 33. The pad 32 is held by being bonded to a leg portion between base portions of the left and right end portions of the stay 33. Second guide members 36L and 36R for guiding, in a non-circular manner, the inner peripheral surface of the belt 31 are mounted around the left and right end portions 33a of the stay 33. Outer peripheral shapes of the second guide members 36L and 36R are non-circular shapes, and the second guide members 36L and 36R are bilaterally symmetrical plate members, and at a plate-surface central portion of each of the members 36L and 36R, a hole portion 36a (FIG. 5), into which the end portion 33a of the stay 33 is to be inserted, is formed. Each of the second guide members 35L and 35R is positioned at the base portion of the end portion 33a by inserting the associated one of the left and right end portions 33a of the stay 33 into the hole portion 36a.

In a state in which the terminal members 35L and 35R are mounted in a predetermined manner at the left and right end portions, respectively, of the belt 31, the end portion 33a of the stay 33 is engaged with the hole portion 35e by being sufficiently inserted into the hole portion 35e. The first guide member 35c is engaged in the inner diameter portion of each of the electric power supply rings 38L and 38R. Each of the second guide members 36L and 36R is positioned, at the base portion of the end portion 33a of the stay 33, by being sandwiched between the end surface of the small outer-diameter circular portion 35d in each of the terminal members 35L and 35R and a surface formed by a stepped portion 33b of the end portion 33a and an end surface 32a of the pad 32 (FIG. 8).

Each of the second guide members 36L and 36R is a guide member which is disposed in a closer side to the central portion with respect to the belt width direction in a state in which the small outer-diameter circular portion 35d is positioned inside the first guide member 35c, and which guides the inner surface of the rotating belt 31 in a non-circular manner.

At an apex portion of the flange member 35a of each of the terminal members 35L and 35R, an associated one of electric power supply members 60L and 60R is provided via a leaf spring 61 of SUS or the like as an electroconductive elastic supporting member (urging means) 34. The terminal members 35L and 35R are elastically contacted, inside the flange members 35a, to outer-diameter surfaces of the electric power supply rings 38L and 38R, respectively, at the left and right end portions of the belt 31. That is, the electric power supply members 60L and 60R are stably contacted to the outer-diameter surfaces of the left and right electric power supply rings 38L and 38R, respectively, of the belt 31, thus being electrically conducted to the outer-diameter surfaces.

Each of the electric power supply members 60L and 60R is formed with a metal brush. In place of the metal brush, a metal block or a carbon chip may also be used.

The thermistor TH is elastically contacted, at a predetermined pressing force, to inner surface of the belt at a substantially central portion with respect to the longitudinal direction of the belt 31 by an elastic force of the elastic supporting member 34.

FIG. 5 is an exploded perspective view showing the belt 31 provided with the electric power supply rings 38L and 38R and showing the pad 32, the stay 33, the elastic supporting member 34, the thermistor TH, the terminal members 35L and 35R, the second guide members 36L and 36R, the electroconductive elastic supporting member 61 and the electric power supply members 60L and 60R. With respect to each of the belt 31, the pad 32 and the stay 33, the intermediate portion is omitted. An assembly of the above members is the belt unit 30.

The pressing roller 40 is an elastic roller including an elastic layer 42 formed on an outer circumferential surface of a metal core 41 composed of a metal material, in a roller shape concentrically integral with the metal core 41, and including an insulating layer 43 formed of a fluorine-containing resin material, on an outer peripheral surface of the elastic layer 42. The material for the elastic layer 42 may preferably be selected from materials including a heat resistant rubber, such as silicone rubber, and a fluorine-containing rubber and including a silicone rubber foam. The outer-diameter shape of the elastic layer 42 of the pressing roller 40 is made a reverse-crown shape in order to stably feed the sheet P, without causing creases, through the nip N. At each of the left and right end portions of the metal core 41, a small-diameter shaft portion 41a is formed concentrically integral with the metal core 41.

The left and right small-diameter shaft portions 41a of the pressing roller 40 are rotatably held and provided, via bearing members 52L and 52R, between left and right side plates 51L and 51R of a fixing device frame 50. At an end portion of the right-side small-diameter shaft portion 41a, a drive gear G is provided concentrically integral with the shaft portion 41a. To this gear G, a driving force of a motor M (driving source) controlled by the control circuit portion 100 is transmitted via a power transmitting mechanism (not shown). As a result, the pressing roller 40 is rotationally driven, as a rotatable driving member, at a predetermined peripheral speed in the counterclockwise direction indicated by an arrow R40 in FIG. 4.

On the other hand, the belt 31 is disposed in an upper side of and substantially parallel to the pressing roller 40 with a downward pad 32, and is provided between the left and right side plates 51L and 51R of the device frame 50. Specifically, the vertical groove portions 35g (FIGS. 2 and 5) provided in the terminal members 35L and 35R of the belt unit 30 are engaged with vertical edge portions of vertical guide slits 51a (FIGS. 3 and 4) provided in the left and right side plates 51L and 51R, respectively.

As a result, the left and right terminal members 35L and 35R are held slidably in an up-down direction relative to the left and right side plates 51L and 51R, respectively. That is, the belt unit 30 is held slidably in the up-down direction of the left and right side plates 51L and 51R, respectively. Each of the pressing springs (urging means) 70L and 70R is compressedly provided between the pressure-receiving block 35f and a fixing spring seating 71 provided above the block portion 35f of an associated one of the left and right terminal members 35L and 35R. In a free state, the pressing springs 70L and 70R press the pressure-receiving blocks 35f of the terminal members 35L and 35R, respectively, downward in the left and right sides at a substantially uniform predetermined pressing force.

As a result, the belt 31 is press-contacted, at a predetermined pressing force against elasticity of the elastic layer 42, to the upper surface of the pressing roller 40 via the stay 33 and the pad 32 (pressing state). For that reason, between the pressing roller 40 and the belt 31 of the belt unit 30, the nip N having a predetermined width is formed along a short direction (sheet feeding direction).

Further, pressure-releasing (eliminating) mechanisms 72L and 72R are provided for eliminating the pressing state of the belt 31 against the pressing roller 40 by raising the left and right terminal members 35L and 35R against the pressing forces of the pressing springs 70L and 70R. In this embodiment, the pressure-releasing mechanisms 72L and 72R are mechanisms for moving the left and right terminal members 35L and 35R, by a lifter 73 against the pressing forces of the pressing springs 70L and 70R, to a predetermined raised position as shown in FIG. 6 and for holding the terminal members 35L and 35R at the position, and are controlled by the control circuit portion 100.

Figure 6:
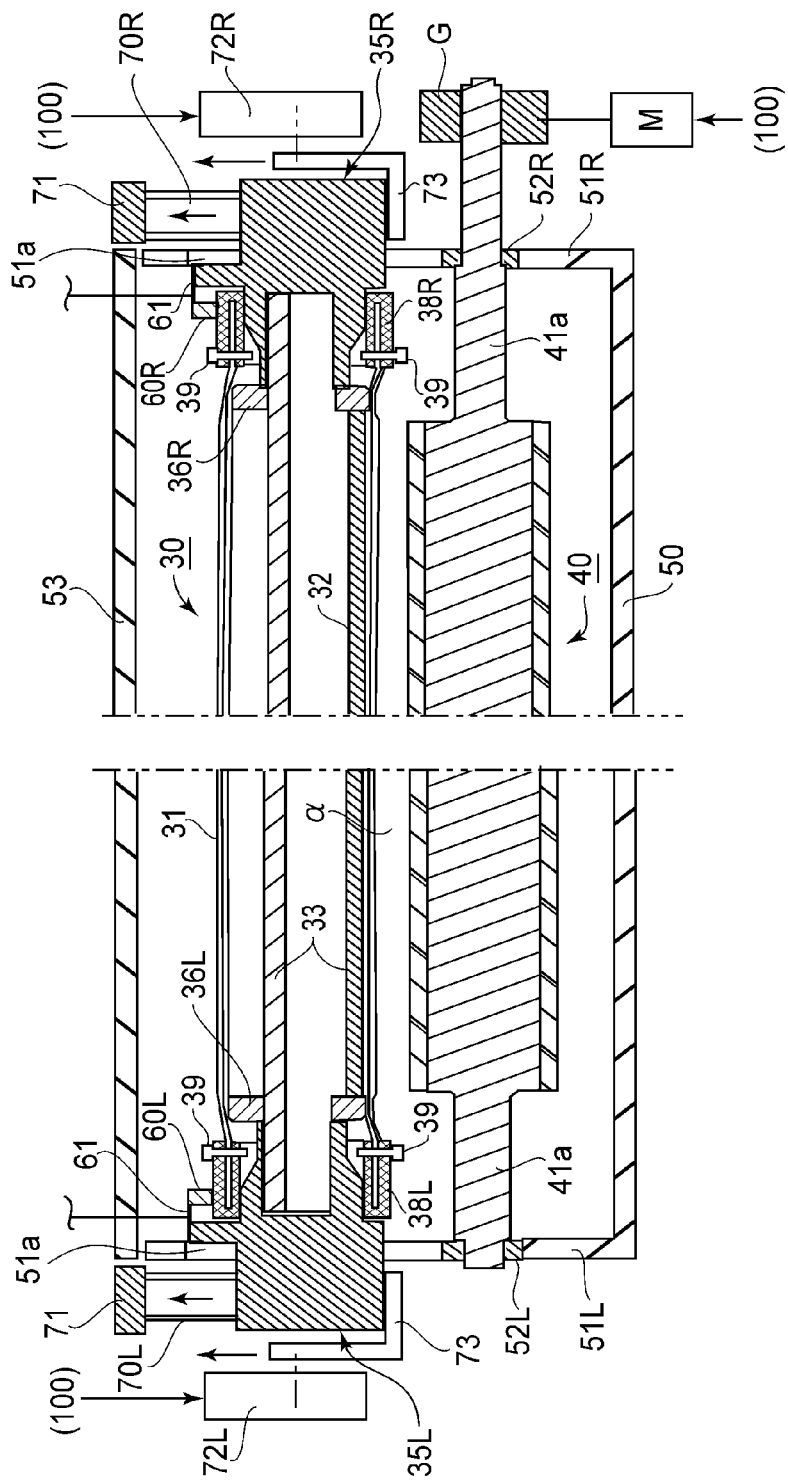
FIG. 6 is a schematic cross-sectional view of the fixing device from which the intermediate portion is omitted.

By the movement of the terminal members 35L and 35R to the predetermined raised position, the entire belt unit 30 is moved in a spaced direction from the pressing roller 40, so that the belt 31 is spaced from the pressing roller 40 by a as shown in FIG. 6. Further, from this pressure-released state, by lowering the lifter 73, the terminal members 35L and 35R are lowered. Then, the lifter 73 is moved to a predetermined lowered position as a non-acting position on the terminal members 35L and 35R, so that the terminal members 35L and 35R are placed again in the pressed state.

Although a specific constitution of the pressure-releasing mechanisms 72L and 72R is omitted from the figures, it is possible to employ, e.g., a mechanism using an electromagnetic solenoid, a mechanism using a cam and a motor or the like.

In FIGS. 2 and 3, W31 represents the full width of the belt 31. W40 represents the width of the pressing roller 40 (excluding the small-diameter shaft portions 41a). The width W40 of the pressing roller 40 is shorter than the full width W31 of the belt 31 by a predetermined length. The length of the stay 33 excluding the left and right end portions 33a is substantially equal to the width W40 of the pressing roller 40. The length of the pad 32 is also substantially equal to the width W40 of the pressing roller 40. The width (length) of the nip N (with respect to the longitudinal direction) is equal to the width W40 of the pressing roller 40.

The left and right electric power supply rings 38L and 38R and the left and right second guide members 36L and 36R of the belt 31 are positioned outside the end portions of the pressing roller 40 (outside the end portions of the nip N). Wmax represents a sheet feeding region width of a maximum-sized sheet usable in the fixing device F (maximum sheet-passing width), and is smaller than the width W40 of the nip N by a predetermined length. The width of the heat generating resistance layer 31b of the belt 31 (a width of the belt 31 in an effective heat generating region) is, in this embodiment, larger than the sheet feeding region width Wmax and is smaller than the width W40 of the nip N.

In FIG. 4, the fixing device F includes an upper surface cover plate 53 thereof, a front surface cover plate 54, an entrance-side guide plate 55, a rear surface cover plate 56, an exit-side guide plate 57 and a fixing discharging roller pair 58. The fixing discharging roller pair 58 is rotationally driven in a predetermined direction at a predetermined peripheral speed by transmission thereto a driving force of the pressing roller 40 via an interrelating mechanism (not shown). The electroconductive elastic supporting members 61 of the left and right electric power supply members 60L and 60R are electrically connected to a power source portion (AC power supply) 101 via wiring 102. Further, the thermistor TH is electrically connected to the control circuit portion 100 via wiring (not shown).

(2-2) Fixing Operation

The fixing device F is held in the pressure-released state shown in FIG. 6 during a device state, other than during sheet feeding and introduction, such as during rise of the fixing device F performed first thing in the morning (during warming up) or during stand-by. The rotation of the pressing roller 40 is stopped. Also electric power supply to the left and right electric power supply members 60L and 60R is stopped.

When a print job start signal is inputted, the control circuit portion 100 controls the power source portion 101 to start electric power supply to the heat generating resistance layer 31b of the belt 31 in a predetermined electric power supply control pattern. That is, a voltage is applied to the left and right electric power supply rings 38L and 38R via the left and right electric power supply members 60L and 60R, respectively. As a result, the electric power supply to the heat generating resistance layer 31b is performed via an electrode layer 31d (FIG. 8), described later, electrically conducted to each of the electric power supply rings 38L and 38R. Further, by heat generation of the heat generating resistance layer 31b by the electric power supply, the belt 31 is heated in the effective heat generating region width in a full circumferential manner.

Electrical information relating to a temperature of the belt 31 is inputted from the thermistor into the control circuit portion 100. The control circuit portion 100 determines an electric power supply pattern on the basis of a detection temperature of the belt 31 inputted from the thermistor TH. Then, the control circuit portion 100 controls the power source portion 101, depending on the determined electric power supply pattern, in accordance with phase control, wave-number control or the like, thus supplying proper electric power to the heat generating resistance layer 31b.

Specifically, when the thermistor TH detects a first predetermined temperature as the temperature of the belt 31, the control circuit portion 100 controls the pressure-releasing mechanisms 72L and 72R to switch the state of the belt unit 30 from the pressure-released state (FIG. 6) to the pressed state (FIGS. 2 and 3). As a result, the belt 31 is press-contacted to the pressing roller 40, so that the nip N is formed therebetween. Further, the control circuit portion 100 actuates the motor M to start rotational drive of the pressing roller 40 as the rotatable driving member.

The pressing roller 40 is rotated at a predetermined peripheral speed in the counterclockwise direction indicated by the arrow R40 shown in FIG. 4. By a frictional force generated, between the pressing roller 40 and the outer surface of the belt 31, by the rotational drive of the pressing roller 40, a rotation torque acts on the belt 31. As a result, the belt 31 closely contacts a sliding surface of the pad 32 in the nip N at an inner surface thereof, and is rotated by the rotation of the pressing roller 40 at a peripheral speed substantially corresponding to the rotational peripheral speed of the pressing roller 40 in the clockwise direction indicated by an arrow R31 shown in FIG. 4 while sliding on the sliding surface of the pad 32.

The flange portion 35a of each of the left and right terminal members 35L and 35R receives an end surface of a belt end portion-side electric power supply ring in a lateral movement side when the rotating belt 31. The first guide members 35c of the left and right terminal members 35L and 35R guide inner peripheral surfaces of the electric power supply rings 38L and 38R rotating together with the belt 31. Further, the left and right second guide members 36L and 36R guides the inner peripheral surfaces of the rotating belt 31.

Thereafter, when the thermistor TH detects a second predetermined temperature higher than the first predetermined temperature, the control circuit portion 100 starts an image forming operation of the image forming portion. Then, the sheet P on which toner images t are formed is conveyed into the fixing device F. On the other hand, when the thermistor TH detects a third temperature (fixing temperature) higher than the second predetermined temperature, the control circuit portion 100 changes a state of electric power supply, from the belt 31 to the heat generating resistance layer 31b, into a temperature-controlled state. In the temperature-controlled state, control of electric power supply from the power source portion 101 to the heat generating resistance layer 31b is performed by using PI control or the like so that the temperature of the belt 31 is kept substantially at a constant level, i.e., at the third predetermined temperature as the fixing temperature.

When the sheet P on which the toner images t are transferred is conveyed into the fixing device F, the sheet P is guided by the entrance-side guide plate 55 to enter the nip N, thus being nipped and conveyed through the nip N. As a result, the toner images t and the sheet P are heated and pressed, so that the toner images are fixed as a fixed image on the sheet P. The introduction of the sheet P into the fixing device F is performed by a so-called center-line basis in which a center line of the sheet width is used as a reference line in this embodiment. The sheet introduction may also be made by a so-called one-side (edge) basis. The sheet P coming out of the nip N is separated from the belt 31 and is guided by the exit-side guide plate 57, and then enters a nip N between a fixing discharging roller pair 58 to be conveyed for discharge.

During execution of a print job at the image forming portion, the state of the fixing device F is transferred from the pressure-released state to the pressed state immediately before the introduction into the fixing device F, and then when the sheet P passes through the fixing device F, the state of the fixing device F is transferred again to the pressure-released state and thus the fixing device F is in stand-by state. When a print job of a predetermined one or plurality of continuous sheets is ended, the control circuit portion 101 stops electric power supply to the heat generating resistance layer 31b of the belt 31. Further, the control circuit portion 101 stops the drive of the motor M. In this state, the control circuit portion holds the fixing device at the stand-by state until a start signal of a subsequent print job is inputted.

(2-3) Structure of Belt 31

In FIG. 7, (a) is an enlarged cross-sectional view 31 in a heat generating region, and (b) is a schematic sectional view showing a layer structure in a left-side end portion of the belt 31. Also a layer structure in a right-side end portion of the belt 31 is similar to the layer structure in the left-side end portion, and the layer structures in the left and right-side end portions provide a bilaterally symmetrical state.

The belt 31 is an endless member (endless belt) having flexibility as a whole. The belt 31 has a three-layer composite structure including lamination of at least three layers, from an outside to an inside, consisting of an insulating layer 31a, the heat generating resistance layer 31b for generating heat by electric power supply, and a cylindrical insulating base material 31c. On an outer surface of the insulating base material 31c in each of the left and right end portions, a ring-shaped electrode layer 31d for supplying electric power to the heat generating resistance layer 31b is provided along a circumferential direction. The end portion of the electrode layer 31d and the end portion of the heat generating resistance layer 31b are electrically conducted to each other in an overlapping manner.

The cylindrical insulating base material 31c has deformable flexibility with respect to the circumferential direction and an insulating property while maintaining the strength of the belt 31. The base material 31c is liable to break when it is excessively thin and is liable to less deform when it is excessively thick, and therefore can use a heat resistant resin material such as polyimide. In this embodiment, as the belt 31, a cylindrical polyimide belt of 50 μm in thickness and 30 mm in diameter was used.

The heat generating resistance layer 31*b* is a layer which is formed on the outer peripheral surface of the cylindrical insulating base material 31*c* and which generates heat by electric power supply. As the material for the heat generating resistance layer 31*b*, it is possible to use a material in which electroconductive carbon or metal powder is dispersed in a heat resistant resin material such as polyimide. In this embodiment, a 25 μm-thick coat layer of a heat generating resistor formed of polyimide in which carbon black is dispersed is used, and a carbon dispersion amount or the like is adjusted so that the resistance value between the left and right electrode layers 31*d* in both end portion sides of the belt 31 is 10 Ω. As a result, under the application of a voltage of 100 V, the heat generating resistance layer 31*b* generates heat by an electric power of about 1000 W.

The insulating layer 31*a* is formed on a whole of the heat generating resistance layer 31*b* and a part of the electrode layer 31*d* in the heat generating resistance layer 31*b* side to prevent current flow to a portion other than the belt 31 and to prevent contamination due to deposition of the toner or the like. The insulating layer 31*a* is required to have a parting property from the toner and is also required to have an insulating property so as to prevent the flow of the current since the insulating layer 31*a* contacts the electrode layer 31*d* and the heat generating resistance layer 31*b*, and therefore as the material therefor, it is possible to use an insulating fluorine-containing resin material such as PFA or PTFE.

There is fear that the insulating layer 31*a* has a short lifetime due to abrasion by friction with the sheet P and the pressing roller 40 when it is excessively thin and that its energy saving property is impaired by a lowering in heat transmission due to an increase in thermal capacity when the insulating layer 31*a* is excessively thick, and therefore the fluorine-containing resin material of 10-50 μm in thickness may desirably be used. In this embodiment, a 20 μm-thick insulating PFA resin tube was used.

The belt 31 is not always needed to have the three-layer structure. For example, in order to obtain a good image quality in the case where a color image is formed, the surface of the belt 31 may preferably be configured to easily follow the surface shape of the sheet P. For that purpose, between the insulating layer 35*a* and the heat generating resistance layer 31*b*, an elastic layer 31*e* ((a) of FIG. 9) formed with a silicone rubber may preferably be provided.

Figure 9:
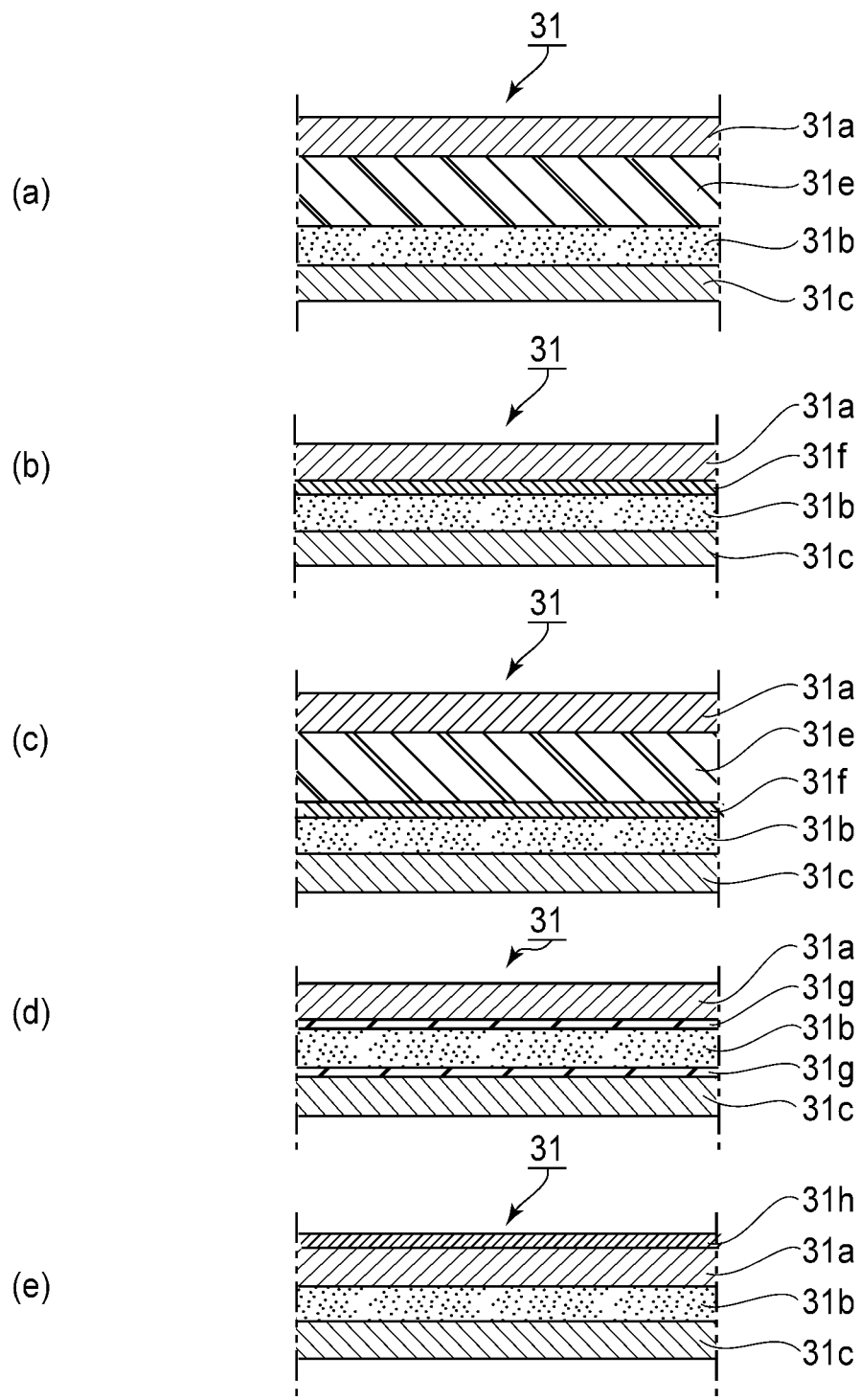
In FIG. 9, (a) to (e) are variations of the layer structure of the belt.

Further, in order to prevent the occurrence of heat deterioration or the like by direct heating of the insulating layer 31*a* or the elastic layer 35*e* by the heat generating resistance layer 35*b*, an intermediary layer 31*f* ((b) and (c) of FIG. 9) may also be provided between the heat generating resistance layer35*b* and the insulating layer 35*a* or the elastic layer 35*e*. Further, in order to enhance the adhesive strength between respective layers of the belt 31, an adhesive layer 31*g* ((d) of FIG. 9) may also be provided. Further, a parting layer 31*h* ((e) of FIG. 9) may also be separately provided on the insulating layer 31*a*, and in this case, an electroconductive material can be used for the parting layer 31*h*. Further, it is possible to employ various combinations of the layer structures of (a) to (e) of FIG. 9.

The electrode layer 31*d* as an electroconductive layer can use a material in which electroconductive particles are dispersed in the heat resistant resin material such as polyimide. Further, by adjusting the resistance value in order to sufficiently decrease the resistance compared with the heat generating resistance layer 31*b*, heat generation in the electrode layer 31*d* can be suppressed. In this embodiment, a 75 μm-thick layer formed of polyimide in which the electroconductive particles are dispersed was used.

(2-4) Electric Power Supply Ring

The electric power supply rings 38L and 38R as a ring(-like) member will be described principally with respect to FIGS. 7 and 8. At end portions of the belt 31, the electric power supply rings 38L and 38R are engaged from the belt end portions so as to sandwich inner and outer diameter surfaces of the cylindrical insulating base material 31*c* at the belt end portions and the electrode layers 31*d* at the outer peripheral surface of the base material 31*c*, and are fixed with fixing screws 39 as a fixing member.

Specifically, each of the electric power supply rings 38L and 38R is a 1 mm-thick copper plate formed by pressing, and includes an outside cylindrical portion 38*a* (first ring member or second ring member) and an inside cylindrical portion 38*b* (second ring member or first ring member), wherein one of the first and second ring members are fitted around the other with the heat generating resistance layer 31*b* sandwiched therebetween. In the case of FIG. 8, the outside cylindrical portion 38*a* is the first ring member externally fitted on the ring-shaped electrode layer 31*d* at the outer peripheral surface of the belt end portion, and the inside cylindrical portion 38*b* is the second ring member internally fitted to the cylindrical insulating base material 31*c* at the belt end portion. The outside cylindrical portion 38*a* and the inside cylindrical portion 38*b* are connected continuously to each other via a connecting portion 38*c* in one end side, and a circular cylindrical gap (spacing) portion 38*d* into which the belt end portion is to be inserted is provided therebetween. That is, the connecting portion 38*c* forms a bottom. In this embodiment, an inner diameter of the inside cylindrical portion 38*b* is about 30 mm.

A part of the outside cylindrical portion 38*a* is provided with a hole portion 38*e* through which a fixing screw is to be passed, and the inside cylindrical portion 38*b* is provided with a tap-processed hole 38*f* at a position corresponding to the hole portion 38*e*. Each of the electric power supply rings 38L and 38R is engaged with the end portion of the belt 31 by sufficiently inserting the belt end portion into the circular cylindrical gap portion 38*d*. Then, the fixing screw 39 is inserted into the tap-processed hole 38*f* by inserting the belt end portion into the hole portion 38*e*, so that the electric power supply rings 38L and 38R are fixed at the end portions of the belt 31. Accordingly, the electric power supply rings 38L and 38R are rotatable integrally with the belt 31.

By sufficiently screwing the fixing screw 39 into the tape-processed hole 38*f*, the inside cylindrical portion 38*b* is attracted toward the outside cylindrical portion 38*a* while being deformed, so that the belt end portion is sandwiched between the inside cylindrical portion 38*b* and the outside cylindrical portion 38*a*. As a result, the electric power supply rings 38L and 38R are fixed to the belt end portions with reliability. Further, the electric power supply rings 38L and 38R and the electrode layers 31*d* are bonded to each other at the belt end portions with reliability and are electrically conducted to each other.

As described above, the electric power supply rings 38L and 38R in this embodiment are fixedly secured to the belt 31 at the left and right end portion sides, and are circular electric power supply rings electrically conducted to the electrode layers 31*d*. Further, each of the electric power supply rings 38L and 38R includes the outside cylindrical portion 38*a* and the inside cylindrical portion 38*b* for sandwiching the belt end portion from an outer diameter surface side and an inner diameter surface side.

The electric power supply members 60L and 60R are contacted, by spring forces of leaf springs 61, to the outer diameter surfaces of the outside cylindrical portions 38a of the electric power supply rings 38L and 38R, respectively. Accordingly, by applying a voltage between the left and right electric power supply members 60L and 60R, the heat generating resistance layer 31b between the electric power supply members 60L and 60R is supplied with electric power via the left and right electrode layers 31d of the belt 31. Each of contact positions of the electric power supply members 60L and 60R with the outer diameter surfaces of the outside cylindrical portions 38a corresponds to the position of the first guide member 35c.

The fixing screw 39 is, as shown in (a) of FIG. 8, provided at a position corresponding to the ring-shaped groove portion 35h as a stepped portion between the first guide member 35c and the small outer diameter cylindrical portion 35d. For that reason, even when the end of the fixing screw 39 projected from the inserting tap-processed hole 38f toward the inside of the inside cylindrical portion 38b, the belt 31 can be rotated without contacting the terminal members 35L and 35R.

Assembling of the belt unit 30 is performed in, e.g., the following manner. On the assembly of the pressing pad 32, the stay 33, the elastic supporting member 34 and the thermistor TH, the cylindrical belt 31 provided with no electric power supply rings 38L and 38R is externally fitted. On the left and right end portions 33a of the stay 33, the second guide members 36L and 36R are mounted. The second guide members 36L and 36R may also be mounted on the left and right end portions 33a of the stay 33 in advance before the belt 31 is externally fitted on the assembly of the pressing pad 32, the stay 33, the elastic supporting member 34 and the thermistor TH.

Then, the electric power supply rings 38L and 38R are engaged and fitted on the belt 31 at the left and right end portions in the above-described manner. Next, into the inside cylindrical portions 38b of the electric power supply rings 38L and 38R, the small outer diameter circular portions 35d and the first guide members 35c of the left and right terminal members 35L and 35R are sufficiently inserted. As a result, the end portion 33a of the stay 33 is sufficiently inserted and engaged into the hole portion 35c, and the first guide member 35c is internally engaged with the inside cylindrical portion 38b. Thereafter, each of the electric power supply rings 38L and 38R is fixed at the end portion of the belt 31 by the fixing screw 39 in the above-described manner.

(2-5)

Figure 10:
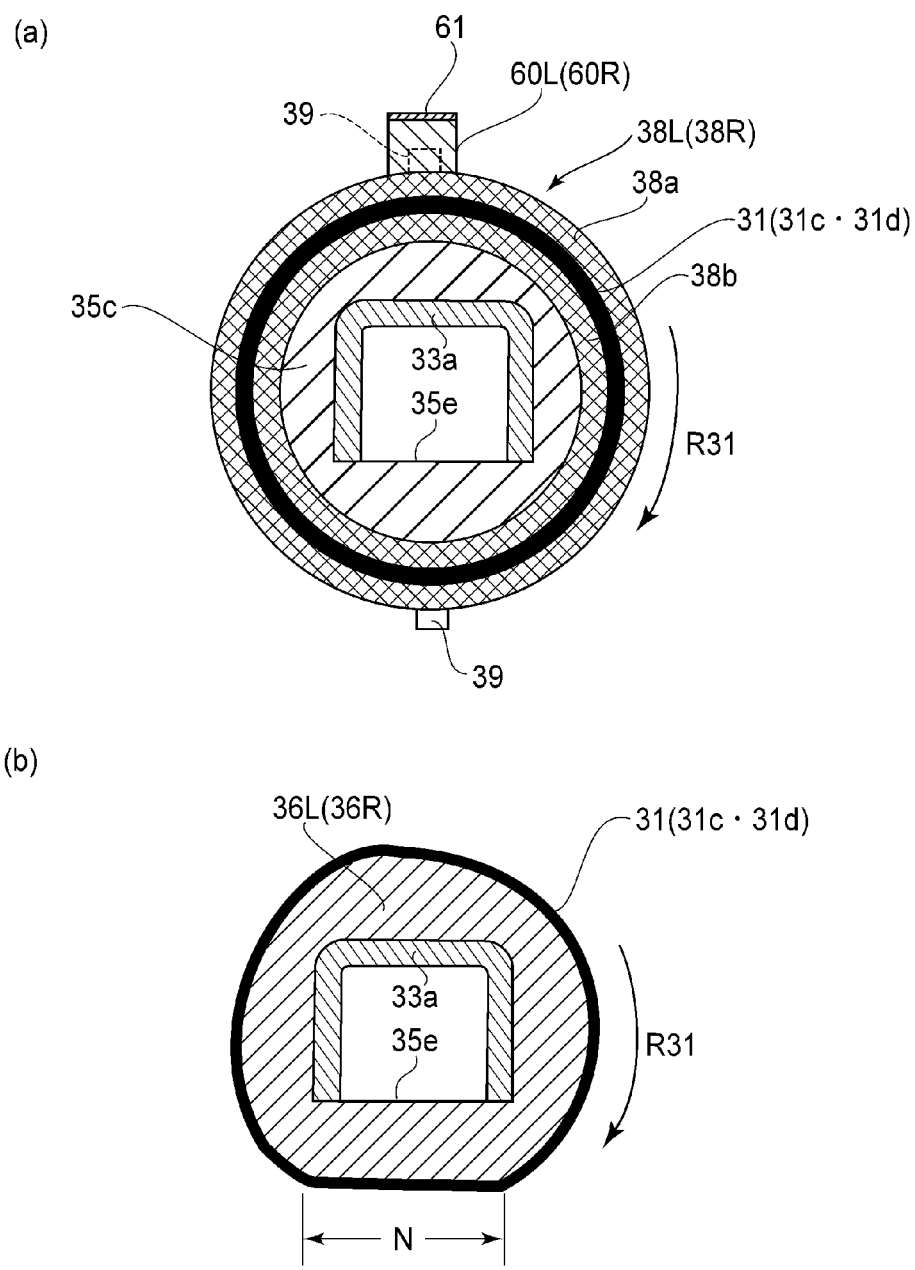
In FIG. 10, (a) and (b) are enlarged cross-sectional views taken along (a)-(a) arrows and (b)-(b) arrows, respectively, indicated in (a) of FIG. 8.

In FIG. 10, (a) and (b) are enlarged cross-sectional views taken along (a)-(a) arrows and (b)-(b) arrows, respectively, indicated in (a) of FIG. 8. That is, (a) and (b) of FIG. 10 are enlarged cross-sectional views of the first guide member 35c portion and the second guide member 36L (36R) portion, respectively, of the belt unit 30.

A cross-sectional surface of the first guide member 35 of each of the terminal members 35L and 35R has a circular shape as shown in (a) of FIG. 10. In this embodiment, an outer diameter of the first guide member 35 is 30 mm, the circular inside cylindrical portion 38b of each of the electric power supply rings 38L and 38R has an outer diameter/inner diameter constitution so as to be stably rotatable around the first guide member 35 by being just fitted externally.

At the end portion of the belt 31, each of the circular electric power supply rings 38L and 38R is mounted as described above, so that the end portion of the belt 31 is kept at the circular shape by this electric power supply ring. Each of the electric power supply rings 38L and 38R are 2 mm in thickness by the outside cylindrical portion 38a and the inside cylindrical portion 38b, and therefore is not readily deformed. The circular first guide member 35 of each of the terminal members 35L and 35R is internally engaged with the inside cylindrical portion 38b of each of the electric power supply rings 38L and 38R.

The belt 31 and the electric power supply rings 38L and 38R mounted at the end portions thereof are rotated by driving of the pressing roller 40 in the clockwise direction indicated by an arrow R31 in FIG. 10. The electric power supply rings 38L and 38R and the first guide members 35 for guiding the rings have a circular shape, and therefore the electric power supply rings 38L and 38R stably slide and rotate along the outer diameter surfaces of the first guide members 35. Therefore, generation of unstable vibration at the contact portion between the electric power supply ring 38L (38R) and the electric power supply member 60L (60R) is alleviated, so that stable electric power supply is ensured.

The cross-sectional surface of each of the second guide members 36L and 36R has a non-circular irregular shape as shown in (b) of FIG. 10 since the belt 31 forms the nip N. For example, the shape is such that the slope is abruptly raised so that a belt rotation locus (left side in the figure) at a downstream side of the nip N with respect to the sheet feeding direction is separated from the nip N earlier than the belt rotation locus (right side in the figure) at an upstream side of the nip N with respect to the sheet feeding direction. By this shape, there is provided a separating property of the sheet P from the belt 31 at the downstream side of the nip N with respect to the sheet feeding direction.

As described above, the shape of the first guide members 35c as an electric power supply member contact portion of the belt 31 and the shape of the second guide members 36L and 36R in the neighborhood of the nip N are different from each other. For that reason, as shown in (a) of FIG. 8, between the first guide member 35c and the second guide member 36L (36R), the ring-shaped groove portion 35h is provided. In this embodiment, an axial length of this ring-shaped groove portion 35h is 10 mm.

The belt 31 has a small thickness of 50 μm, and therefore at the above-described ring-shaped groove portion 35h, the outer diameter shape of the belt 31 is deformable from the circular shape of the belt 31 in the electric power supply ring side to the irregular shape of the belt 31 in the second guide member 36L (36R) side. Further, at the ring-shaped groove portion 35h, the terminal member 35L (35R) does not contact the belt 31, and therefore the belt 31 is slidable and rotatable on the first guide members 35c, the second guide members 36L and 36R and the pad 32 without an increase in torque load.

Further, when the rotating belt 31 is laterally moved in the widthwise direction, the end surfaces of the electric power supply rings 38L and 38R in the laterally moved side (the connecting portions 38c between the outside cylindrical portion 38a and the inside cylindrical portion 38b) contact and slide on an abutment surface 35b of the flange member 35a in a side thereof. As a result, the lateral movement (shift) of the belt 31 is limited. That is, the belt end portion does not directly contact the abutment surface 35b of the flange member 35a.

As a result, problems resulting from abrasion of the belt end portion and abrasion powder in the case where the belt end portion directly contacts and slides on the abutment surface 35b are solved. The electric power supply rings 38L and 38R are formed of copper and also have a thickness, and therefore are not abraded even when contact and slide on the abutment surface 35b of the flange member 35a.

During the pressure-released state of the fixing device F, the belt unit 30 is raised and moved, so that the belt 31 is spaced from the pressing roller (FIG. 6). At that time, the shape of the belt 31 follows the circular shape of the electric power supply rings 38L and 38R by resilience of the belt 31. Further, the second guide members 36L and 36R have the irregular shape, and therefore the belt 31 is separated from the nip N. As a result, the belt 31 is spaced from the pad 32 and is placed in a state in which the belt does not contact any portion except for the electric power supply rings 35L and 35R toward the terminal members 35L and 35R.

For that reason, during the pressure-released state of the fixing device F in FIG. 6, heat dissipation from the belt 31 toward the pad 32 is alleviated. As a result, the temperature rise during rise at start of the day is faster than that during the pressed state as shown in FIGS. 2 and 3, so that the warm-up time can be shortened. Further, the heat dissipation from the belt 31 during stand-by can be alleviated, so that it becomes possible to increase energy consumption efficiency.

Figure 11:
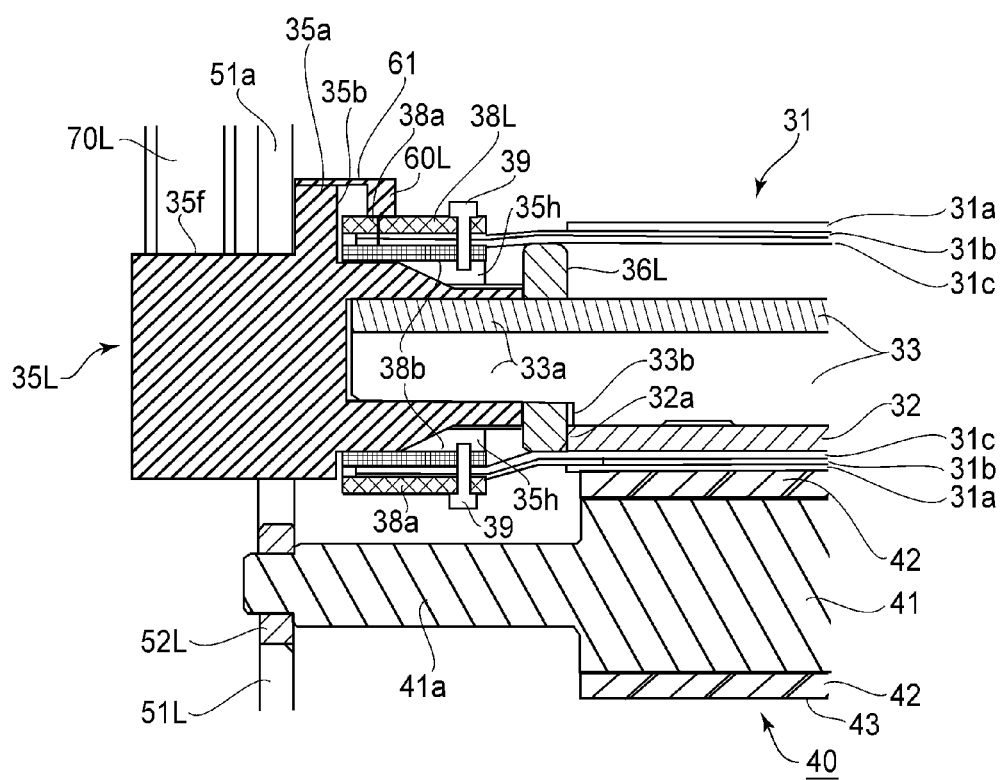
FIG. 11 is an illustration of another structure of an electric power supply ring.

The electric power supply rings 38L and 38R are not limited to the form such that the outside cylindrical portion 38a and the inside cylindrical portion 38b are continuously connected with each other via the connecting portion 38c in one side as described above. The electric power supply rings 38L and 38R may also have the form such that the outside cylindrical portion 38a and the inside cylindrical portion 38b are not connected by the connecting portion 38c and as shown in FIG. 11, the outside cylindrical portion 38a and the inside cylindrical portion 38b of each of the electric power supply rings 38L and 38R are formed as separate members in a divided manner. By dividing the electric power supply ring in this way, a processing property and an assembling property of the electric power supply rings 38L and 38R are improved. In this case, the inside cylindrical portion (ring member) 38b sandwiches the belt 31 between itself and the outside cylindrical portion (ring member) 38a, thus performing the function of hermetical contact of the outside cylindrical portion 38a with the belt (electroconductive layer).

Further, for fixing the electric power supply rings 38L and 38R on the belt end portions (resistance layers) the fixing screws 39 are used, but a fixing member, called a rivet pin, such that a pin end portion is heated and pressed down to fix the electric power supply ring to the belt end portion may also be used.

Further, it is also possible to employ a constitution in which each of the outside cylindrical portion 38a and the inside cylindrical portion 38b is provided with a projection and the electric power supply ring is fixed on the belt end portion by using a spring property of the electric power supply ring.

By the above constitution, the electric power supply rings 38L and 38R are stably rotatable, so that the problem of the occurrence of improper electric conduction caused by vibration of the electric power supply members 60L and 60R contacted to the electric power supply rings 38L and 38R was able to be prevented. Further, the electric power supply members 60L and 60R do not directly contact the electrode layers 31d. For that reason, abrasion and peeling-off of the electrode layer surfaces caused by the vibration of the electric power supply members 60L and 60R was able to be prevented, so that it became possible to prolong the life of the belt 31. Further, during the pressure release, the belt surface is spaced from the pad 32, and therefore the warm-up time was able to be shortened.

Further, the belt end portion is sandwiched between the inner and outer diameter surfaces of each of the electric power supply rings 38L and 38R, so that the belt 31 and the electric power supply rings 38L and 38R are fixed with reliability. For that reason, it was possible to prevent the electric power supply rings 38L and 38R separating from the belt 31, and thus electric power supply was able to be stabilized.

Incidentally, in this embodiment, the constitution in which the electric power supply ring is contacted to the electrode layer formed on the belt 31 is employed, but the following constitution may also be employed. For example, the constitution in which the electroconductive electric power supply ring is directly contacted to the heat generating resistance layer without providing the electrode layer may also be employed.

[Embodiment 2]

Figure 12:
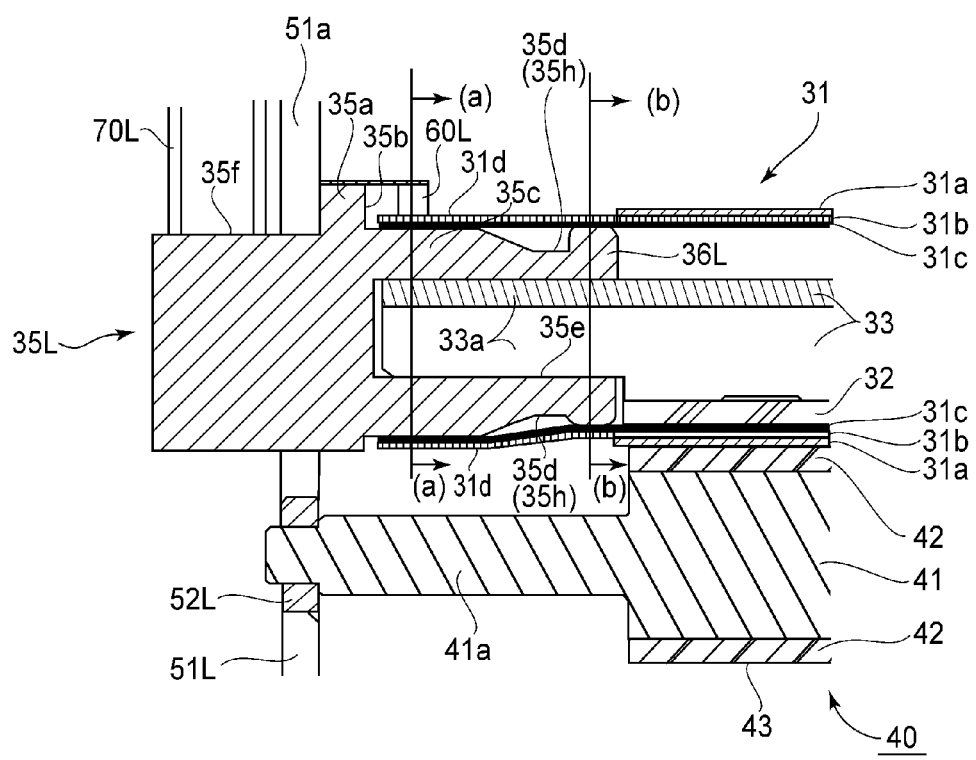
FIG. 12 is an enlarged schematic view of a left-side terminal member and its peripheral portion of a fixing device in Embodiment 2.
Figure 13:
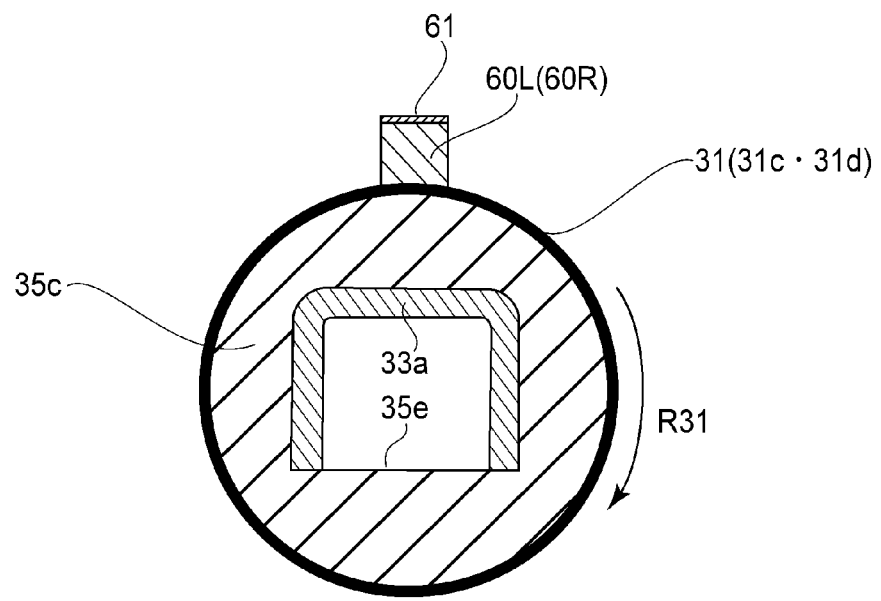
In FIG. 13, (a) and (b) are enlarged cross-sectional views taken along (a)-(a) arrows and (b)-(b) arrows, respectively, indicated in (a) of FIG. 12.
Figure 13:
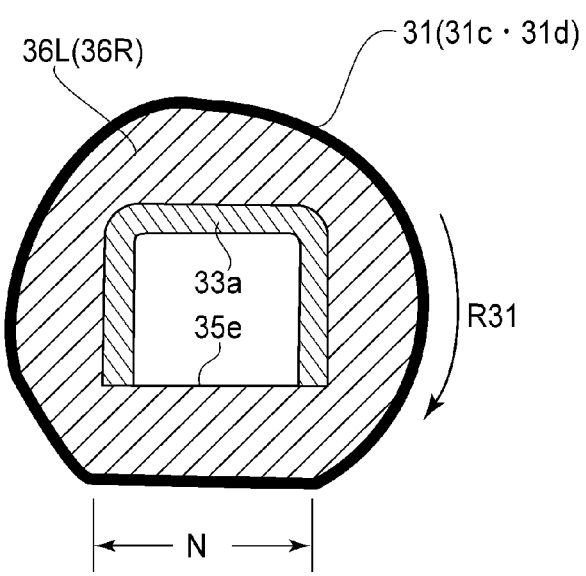

FIG. 12 is an enlarged cross-sectional front view of a left-side terminal member 35L and its peripheral portion of a fixing device in Embodiment 2. Although a right-side terminal member 35R and its peripheral portion are omitted from illustration in FIG. 12, but the left and right terminal members 35L and 35R and their peripheral portions provide a bilaterally symmetrical structure. In FIG. 13, (a) and (b) are enlarged cross-sectional views taken along (a)-(a) arrows and (b)-(b) arrows, respectively, in FIG. 12. That is, (a) and (b) of FIG. 13 are the enlarged cross-sectional views of a portion of the first guide member 35c and a portion of the second guide member 36L (36R), respectively, of the belt unit 30 in Embodiment 2.

In this embodiment, at end portions of the belt 31, electric power supply rings 38L and 38R are not mounted different from Embodiment 1. As a ring-shaped electrode layer 31d provided at each of end portions of the belt 31, in this embodiment, a 75 μm-thick layer of polyimide in which electroconductive particles were dispersed was used.

Further, in Embodiment 1, the constitution in which the terminal members 35L and 35R and the second guide members 36L and 36R are provided as the separate members in a divided manner is employed. In this embodiment, the terminal member 35L (35R) and the second guide member 36L (36R) are provided as an integral member, i.e., the first guide member 35c and the second guide member 36L (36R) are provided as an integral member. That is, each of the terminal members 35L and 35R have a shape such that the second guide member 35L (35R) is continuously formed integrally with the terminal member 35L (35R) in an end side of the small outer diameter circular portion 35d extended from the first guide portion 35c.

The cross-sectional surface of the first guide member 35c has the circular shape similarly as in Embodiment 1, and an outer diameter thereof is 30 mm which is substantially equal to the inner diameter of the belt 31. In this embodiment, the end portion of the belt 31 is externally fitted on the first guide member 35c, so that the rotational shape of the rotating belt 31 at the end portion is limited by the first guide member 35c. That is, an inner diameter shape of the belt 31 at the end portion where the electrode layer 31d formed in the ring shape on the outer peripheral surface of the cylindrical insulating base material 31b is limited to the circular shape.

To the outer surface of the electrode layer 31d provided at the end portion of the belt 31 where the rotational shape is limited to the circular shape by the first guide member 35c, each of the electric power supply members 60L and 60R is elastically contacted by a spring force of the leaf spring 61. That is, a contact position of each of the electric power supply members 60L and 60R with the outer surface of the electrode layer 31d corresponds to a position of the first guide member 35c.

The cross-sectional surfaces of the second guide members 36L and 36R, direction constitutions other than those described above, the fixing operation are similar to those for the fixing device in Embodiment 1.

Also in the case of the fixing device in this embodiment, the shape of the first guide member 35c for guiding the belt end portion is the circular shape, and therefore when the belt 31 is rotated by rotational drive of the pressing roller 40, the belt end portion slides and rotate along the outer diameter surface of the circular first guide member 35c. Therefore, an occurrence of unstable vibration at a contact portion between the electric power supply member 60L (60R) and the electrode layer 31d formed in the ring shape on the outer peripheral surface of the belt end portion is alleviated, so that stable electric power supply is ensured.

Further, by an irregular-shaped second guide member 36L (36R) for guiding the inner surface of the rotating belt 31, a separation property of the sheet P from the belt 31 at a downstream side of the nip N with respect to the sheet feeding direction is improved.

Further, similarly as in the fixing device in Embodiment 1, at the ring-shaped groove portion 35h between the first guide member 35c and the second guide member 36L (36R), the terminal member 35L (35R) does not contact the belt 31. For that reason, the belt 31 is not increased in torque load, so that the belt 31 is slidable and rotatable on the first guide members 35c, the second guide members 36L and 36R and the pad 32.

In this embodiment, when the rotating belt 31 is laterally moved in the widthwise direction, lateral movement of the belt is limited by contact and slide of the belt end surface in the laterally moved side with the abutment surface 35a of the flange member 35a.

Also in this embodiment, contact of the electric power supply member 60L (60R) with the electrode layer 31d is stabilized, and therefore a problem of an occurrence of improper electric conduction caused by vibration of the electric power supply member 60L (60R) was able to be prevented. Further, it was also possible to prevent abrasion and peeling-off of the surface of the electrode layer 31d caused by the vibration of the electric power supply member and to prolong the lifetime of the belt 31. During the pressure release of the belt unit 30 from the pressing roller 40, the surface of the belt 31 was spaced from the pad 32, and therefore the warm-up time was able to be shortened similarly as in the fixing device in Embodiment 1.

[Embodiment 3]

Figure 14:
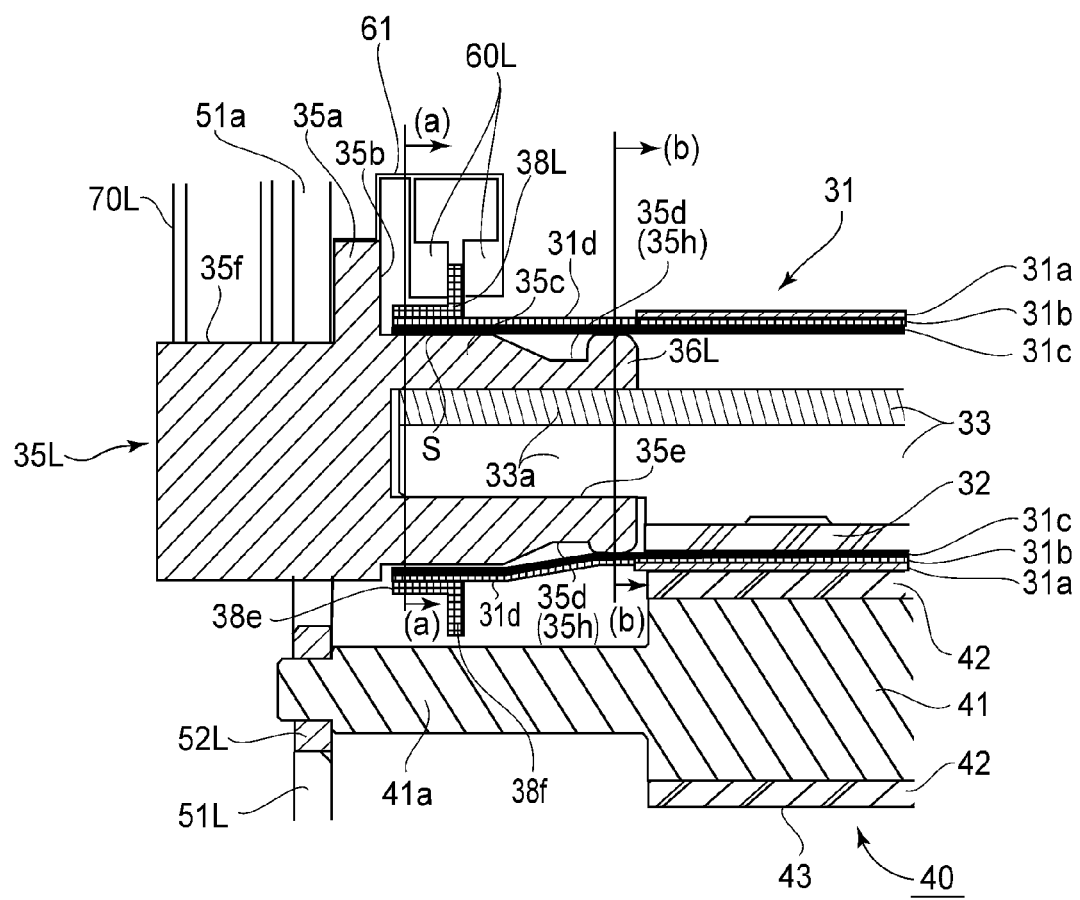
FIG. 14 is an enlarged schematic view of a left-side terminal member and its peripheral portion of a fixing device in Embodiment 3.
Figure 15:
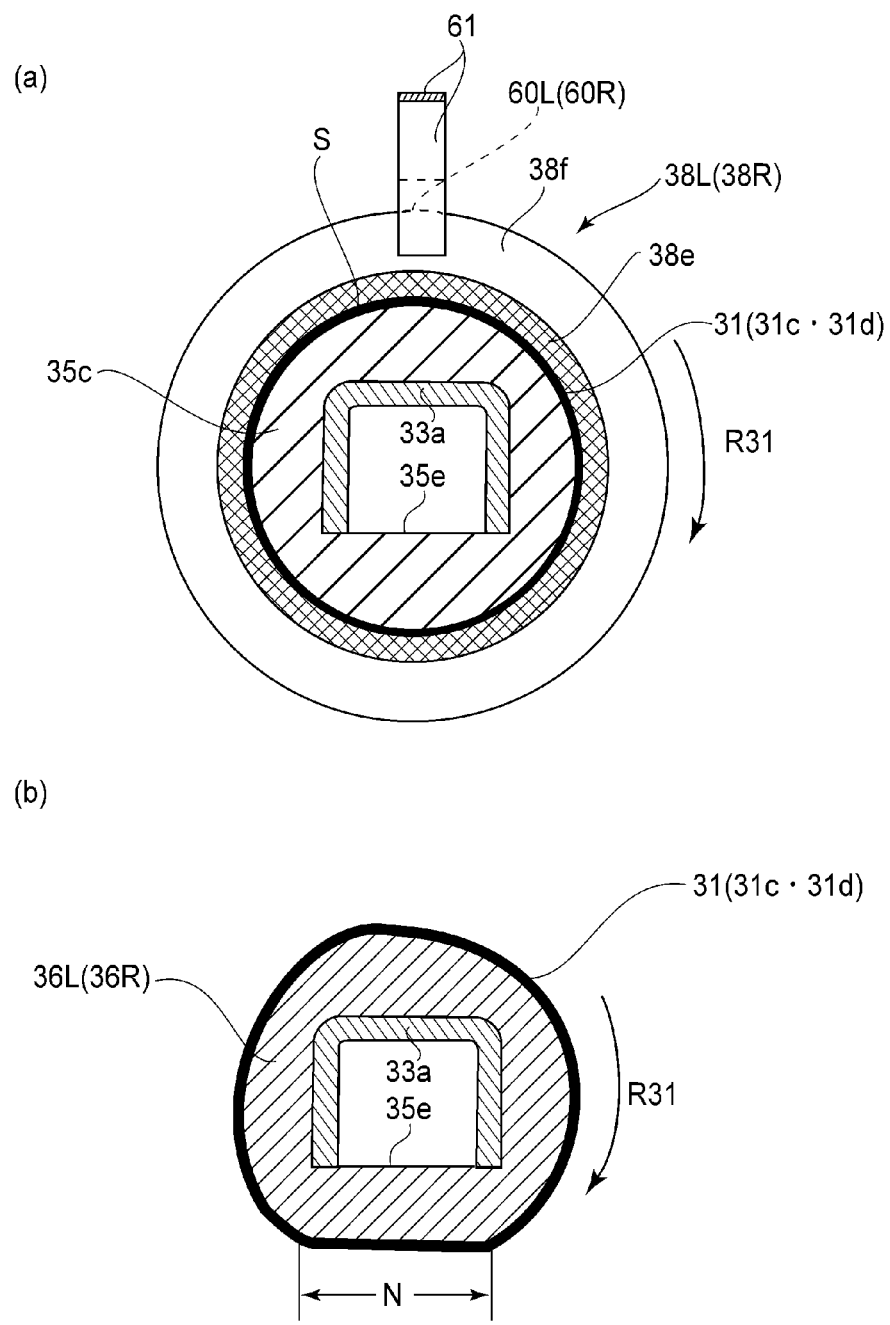
In FIG. 15, (a) and (b) are enlarged cross-sectional views taken along (a)-(a) arrows and (b)-(b) arrows, respectively, indicated in (a) of FIG. 14.

FIG. 14 is an enlarged cross-sectional front view of a left-side terminal member 35L and its peripheral portion of a fixing device in Embodiment 3. Although a right-side terminal member 35R and its peripheral portion are omitted from illustration in FIG. 14, but the left and right terminal members 35L and 35R and their peripheral portions provide a bilaterally symmetrical structure. In FIG. 15, (a) and (b) are enlarged cross-sectional views taken along (a)-(a) arrows and (b)-(b) arrows, respectively, in FIG. 14. That is, (a) and (b) of FIG. 13 are the enlarged cross-sectional views of a portion of the first guide member 35c and a portion of the second guide member 36L (36R), respectively, of the belt unit 30 in Embodiment 3.

With respect to the fixing device in this embodiment, in the fixing device in Embodiment 2, each of the circular-shaped electric power supply rings 38L and 38R is externally fitted on the ring-shaped electrode layer 31d at an associated one of the end portions of the belt 31 and is bonded and fixed via an electroconductive adhesive S. Further, a device constitution in which the electric power supply members 60L and 60R are contacted to the electric power supply rings 38L and 38R, respectively, is employed. In this case, the electroconductive adhesive S functions as a fixing member.

The electric power supply rings 38L and 38R in this embodiment are formed of copper, and is a member which includes a circular short cylindrical portion 38e of 30.4 mm in inner diameter, 2 mm in thickness and 9 mm in width and a ring-shaped projected portion 38f, of 45 mm in diameter, concentrically integral with the circular short cylindrical portion 38e and which is not readily deformed.

Each of the electric power supply rings 38L and 8R is prepared by externally fitting the circular short cylindrical portion 38e on the electrode layer 31d formed at the end portion of the belt 31 and by bonding the outer peripheral surface of the electrode layer 31d to the inner peripheral surface of the circular short cylindrical portion 38e with the electroconductive adhesive S. As the adhesive S, an electroconductive heat-resistant adhesive in which silver particles (filler) are contained in a silicone resin material (binder component) is used. Although the electroconductive heat-resistant adhesive is used in this embodiment, another means such as a high-temperature solder may also be used.

As a result, the shape of each of the left and right end portions of the belt 31 is maintained at the circular shape. Each of the circular first guide members 35c of the left and right terminal members 35L and 35R are internally fitted to an associated one of the left and right end portions of the belt 31 kept in the circular shape. As a result, the end portions of the belt 31 are stably rotatable.

To a ring-shaped projected edge portion 38f of each of the electric power supply rings 38L and 38R, an associated one of the electric power supply members 60L and 60R elastically sandwiches and contacts from both sides, thus being stably contacted and electrically conducted to the ring-shaped projected edge portion 38f.

The cross-sectional surfaces of the second guide members 36L and 36R, direction constitutions other than those described above, the fixing operation are similar to those for the fixing device in Embodiment 1.

Also in the case of the fixing device in this embodiment, the shape of the first guide member 35c for guiding the belt end portion is the circular shape. For that reason, when the belt 31 is rotated by rotational drive of the pressing roller 40, the inner diameter surface of the belt end portion slides and rotate along the outer diameter surface of the circular first guide member 35c. Therefore, an occurrence of unstable vibration at a contact portion between the electric power supply member 60L (60R) and the circular electric power supply ring 38L (38R) provided at the belt end portion is alleviated, so that stable electric power supply is ensured.

Further, by an irregular-shaped second guide member 36L (36R) for guiding the inner surface of the rotating belt 31, a separation property of the sheet P from the belt 31 in a downstream side of the nip N with respect to the sheet feeding direction is improved.

Further, similarly as in the fixing device in Embodiment 1, at the ring-shaped groove portion 35h between the first guide member 35c and the second guide member 36L (36R), the terminal member 35L (35R) does not contact the belt 31. For that reason, the belt 31 is not increased in torque load, so that the belt 31 is slidable and rotatable on the first guide members 35c, the second guide members 36L and 36R and the pad 32.

Also in this embodiment, contact of the electric power supply member 60L (60R) with the electrode layer 31*d* is stabilized, and therefore a problem of an occurrence of improper electric conduction caused by vibration of the electric power supply member 60L (60R) was able to be prevented. Further, the electric power supply member 60L (60R) does not directly contact the electrode layer 31*d*. For that reason, it was also possible to prevent abrasion and peeling-off of the surface of the electrode layer 31*d* caused by the vibration of the electric power supply member and to prolong the lifetime of the belt 31. During the pressure release of the belt unit 30 from the pressing roller 40, the surface of the belt 31 was spaced from the pad 32, and therefore the warm-up time was able to be shortened similarly as in the fixing devices in Embodiments 1 and 2.

[Embodiment 4]

Figure 16:
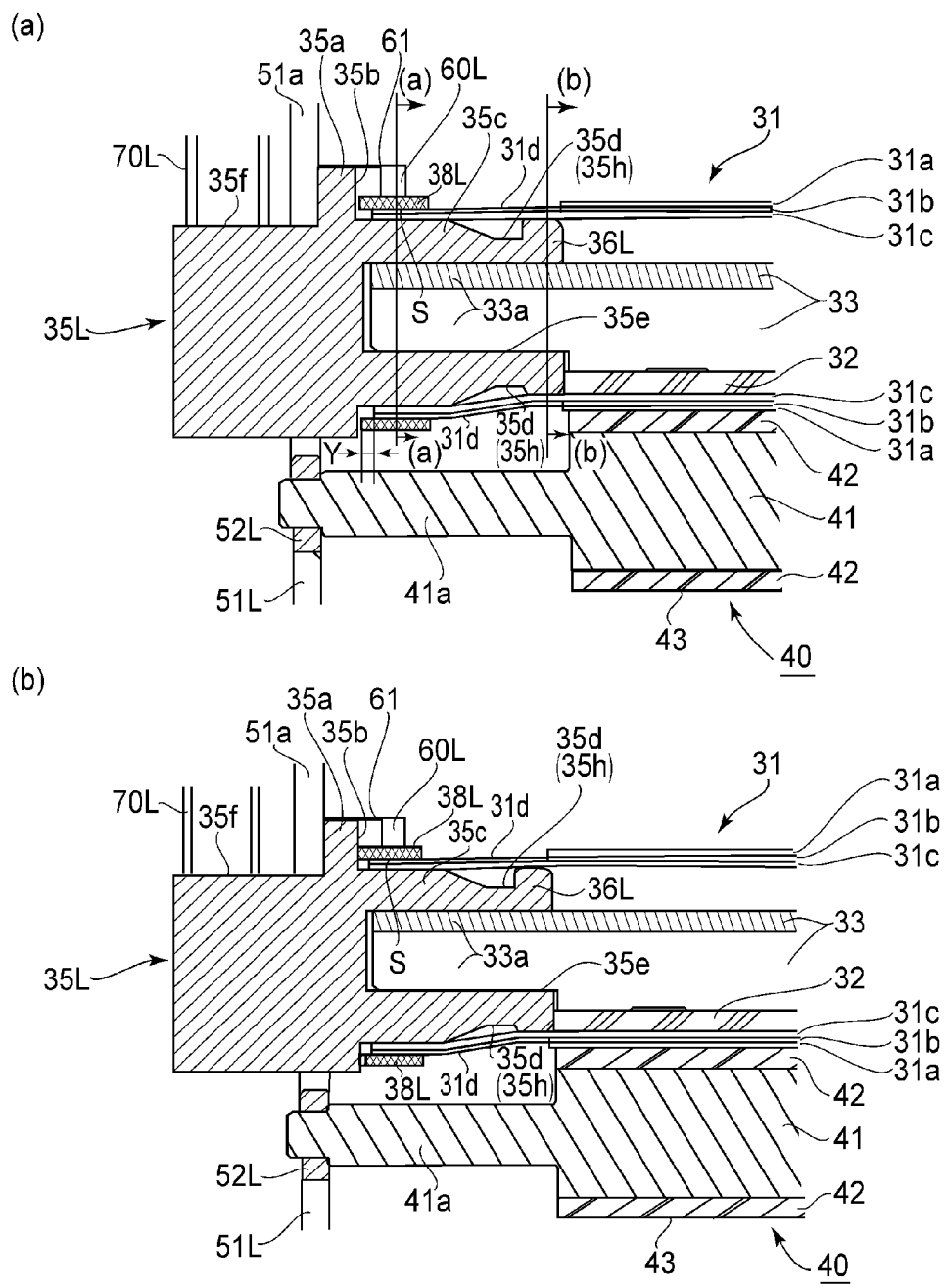
In FIG. 16, (a) is an enlarged schematic view of a left-side terminal member and its peripheral portion of a fixing device in Embodiment 4, and (b) is a schematic view showing a state in which movement of a belt is limited by contact of an end surface of a left-side electric power supply ring with an abutment surface of a flange member in the same side.
Figure 17:
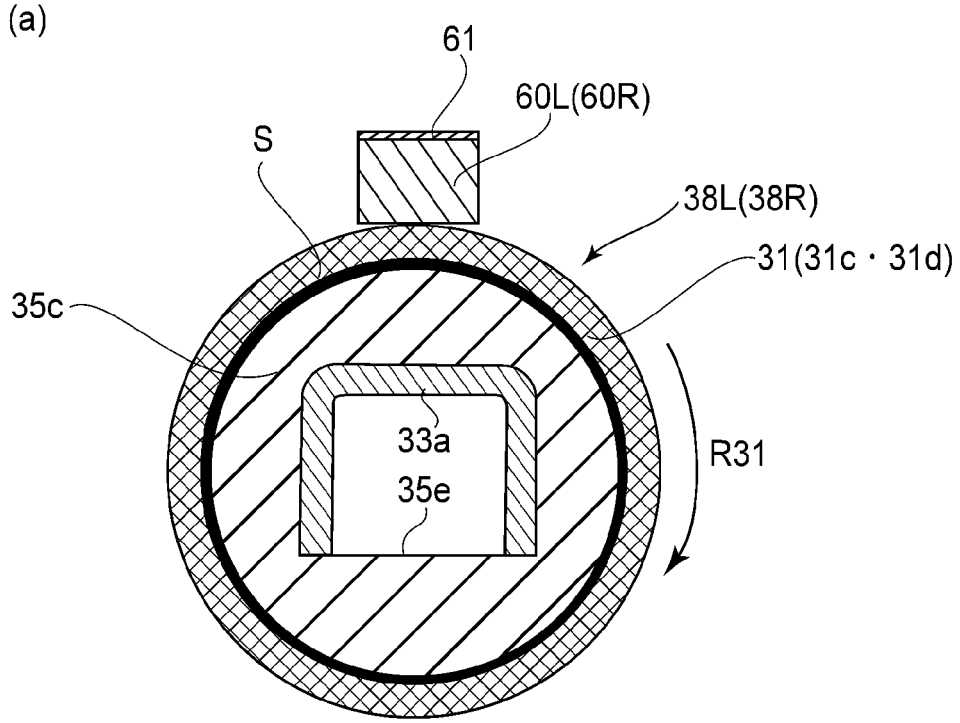
In FIG. 17, (a) and (b) are enlarged cross-sectional views taken along (a)-(a) arrows and (b)-(b) arrows, respectively, indicated in FIG. 16.
Figure 17:
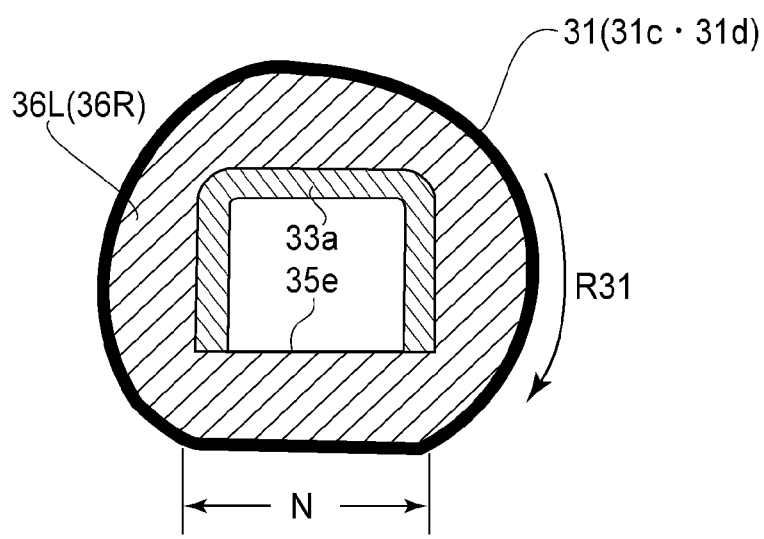

In FIG. 16, (a) is an enlarged cross-sectional front view of a left-side terminal member 35L and its peripheral portion of a fixing device in Embodiment 4. Although a right-side terminal member 35R and its peripheral portion are omitted from illustration in (a) of FIG. 16, but the left and right terminal members 35L and 35R and their peripheral portions provide a bilaterally symmetrical structure. In FIG. 17, (a) and (b) are enlarged cross-sectional views taken along (a)-(a) arrows and (b)-(b) arrows, respectively, in (a) of FIG. 16. That is, (a) and (b) of FIG. 13 are the enlarged cross-sectional views of a portion of the first guide member 35*c* and a portion of the second guide member 36L (36R), respectively, of the belt unit 30 in Embodiment 4.

With respect to the fixing device in this embodiment, in the fixing device in Embodiment 2, each of the circular-shaped electric power supply rings 38L and 38R is externally fitted on the ring-shaped electrode layer 31*d* at an associated one of the end portions of the belt 31 and is bonded and fixed via an electroconductive adhesive S. Further, a device constitution in which the electric power supply members 60L and 60R are contacted to the electric power supply rings 38L and 38R, respectively, is employed. The electric power supply rings 38L and 38R are formed of copper, and is a circular short cylindrical member of 30.4 mm in inner diameter, 2 mm in thickness and 9 mm in width and which is not readily deformed.

Each of the electric power supply rings 38L and 8R is prepared by being externally fitted on the electrode layer 31*d* formed at the end portion of the belt 31 and by bonding the outer peripheral surface of the electrode layer 31*d* to the inner diameter surface thereof with the electroconductive adhesive S. As the adhesive S, an electroconductive heat-resistant adhesive in which silver particles (filler) are contained in a silicone resin material (binder component) is used. Although the electroconductive heat-resistant adhesive is used in this embodiment, another means such as a high-temperature solder may also be used.

As a result, the shape of each of the left and right end portions of the belt 31 is maintained at the circular shape. Each of the circular first guide members 35*c* of the left and right terminal members 35L and 35R are internally fitted to an associated one of the left and right end portions of the belt 31 kept in the circular shape. As a result, the end portions of the belt 31 are stably rotatable.

Further, each of the electric power supply rings 38L and 38R is bonded to the belt 31 in a state in which the electric power supply ring is projected outward from the end surface of the belt 31 in Y mm. That is, each of the electric power supply rings 38L and 38R includes the portion projected outward from the end portions of the belt 31 with respect to a thrust direction. In this embodiment, a projected amount Y is 1 mm (Y (ring projection amount) in (a) of FIG. 16).

As a result, as shown in (b) of FIG. 16, even when the belt 31 is laterally moved in the widthwise direction during rotation, the lateral belt movement is limited by contact and slide of the end surface of the electric power supply ring 38L and 38R in the laterally moved side with the abutment surface 35*b* of the flange member 35*a* in the same side. That is, the belt end portion does not directly contact the abutment surface 35*b* of the flange member 35*a*. As a result, a problem resulting from abrasion and abrasion powder of the belt end portion in the case where the belt end portion directly contacts and slides with the abutment surface is solved. Each of the electric power supply rings 38L and 38R is formed of copper and a thickness thereof is 2 mm, and therefore the electric power supply ring is not abraded even when is contacted and slid with the abutment surface 35*b* of the flange member 35*a*.

In this way, the belt end portion does not directly abut against the abutment surface 35*b* of the flange member 35*a*, and therefore, it becomes possible to prevent the occurrence of the abrasion powder carried by the belt end portion abrasion, so that it is possible to provide the fixing device capable of realizing an extension of the lifetime of the belt 31 and capable of obtaining a good image.

The cross-sectional surfaces of the second guide members 36L and 36R, direction constitutions other than those described above, the fixing operation are similar to those for the fixing devices in Embodiments 1 to 3.

Also in this embodiment, contact of the electric power supply member 60L (60R) with the electric power supply ring 38L (38R) is stabilized, and therefore the problem of the occurrence of improper electric conduction caused by vibration of the electric power supply member 60L (60R) was able to be prevented. Further, the electric power supply member 60L (60R) does not directly contact the electrode layer 31*d*. For that reason, it was also possible to prevent abrasion and peeling-off of the surface of the electrode layer 31*d* caused by the vibration of the electric power supply member and to prolong the lifetime of the belt 31. During the pressure release of the belt unit 30 from the pressing roller 40, the surface of the belt 31 was spaced from the pad 32, and therefore the warm-up time was able to be shortened similarly as in the fixing devices in Embodiments 1 to 3.

Further, the electric power supply rings 38L and 38R are bonded while projecting from the end portions of the belt 31, and therefore it was possible to prolong the lifetime of the belt 31 with no abrasion of the belt end portion, and it became possible to provide the fixing device capable of obtaining a good image.

[Embodiment 5]

In this embodiment, an electric power supply ring fixing constitution is different from those in Embodiments 1 to 4. Other constitutions are similar to those in Embodiment 1 described above.

Figure 18:
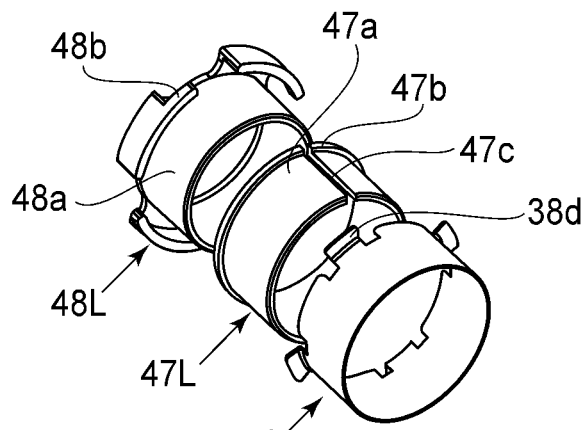
In FIG. 18, (a) is another structural example of the electric power supply ring, (b) is a perspective view showing assembly of the belt, and (c) is a perspective view showing an assembled state.
Figure 18:
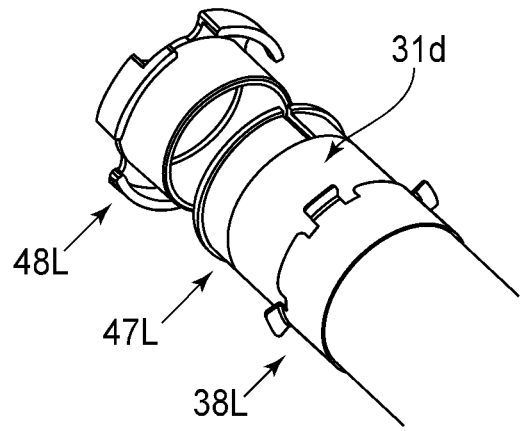
Figure 18:
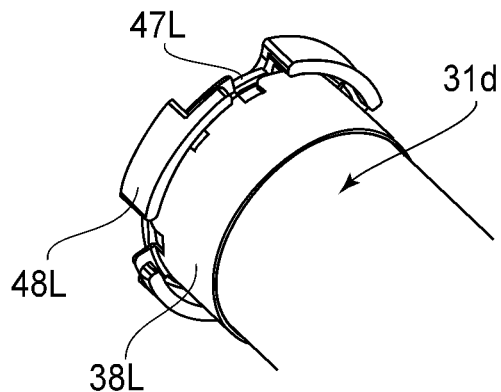

Description will be made with reference to (a) to (c) of FIG. 18 showing the electric power supply ring constitution. An electric power supply portion is constituted by electric power supply rings 38L and 38R as the ring member, inner rings 47L and 47R as the ring member, and fixing rings (ring-shaped holding members) 48L and 48R functioning as the fixing member.

Specifically, each of the electric power supply rings 38L and 38R is a press working product of metal (a copper plate in this embodiment) formed in a thickness of 1 mm, and is externally fitted on the ring-shaped electrode layer 31*d* provided at the outer peripheral surface of the belt end portion, and is provided with a projected portion 38*d* in the same end portion side. Each of the inner rings 47L and 47R is a resin-made component and includes a ring-shaped portion 47*a* to be inserted into the inner peripheral surface of the belt end portion, a flange portion 47*b* having a larger diameter than the belt diameter, and a slit 47*c* provided in an axial direction thereof. Each of the fixing rings 48L and 48R is a resin-made component and includes a ring-shaped portion having a tapered portion 48*a* to be inserted into the inner surface of the associated one of the inner rings 47L and 47R and includes a claw portion 48*b* provided at the end portion.

In this embodiment, the tapered portion 48*a* of each of the fixing rings 48L and 48R is provided with a slope of about 3 degrees. In this embodiment, each of the inner rings 47L and 47R and the fixing rings 48L and 48R is a mold product of PPS (polyphenylene sulfide) resin material.

Further, the belt end portion is assembled in a state in which the belt end portion is sandwiched between the electric power supply ring 38L (38R) and the inner ring 47L (47R), and then the fixing ring 48L (48R) is inserted into the inner ring 47L (47R). Thus, the inner ring 47L (47R) is deformed so as to be pressed and expanded by the tapered portion 48*a* of the fixing ring 48L (48R). Further, the claw portion 48*b* of the fixing ring 48L (48R) is hooked on the projected portion 38*d* of the electric power supply ring 38L (38R), so that the electric power supply ring 38L (38R) is fixed to the belt end portion (state of (c) of FIG. 18). Finally, the electric power supply ring 38L (38R) and the electrode layer 31*d* at the belt end portion are bonded and electrically conducted to each other with reliability.

In this way, in this embodiment, as the fixing member, not the screw, the fixing ring is used. Thus, there is no need to provide the belt with a hole (into which the screw is to be penetrated), so that it becomes possible to improve durability of the belt.

Incidentally, in this embodiment, the constitution in which the electroconductive electric power supply ring is contacted to the electrode layer formed on the belt is employed, but the following constitution may also be employed. For example, a constitution in which the belt is not provided with the electrode layer, and the electric power supply ring is directly contacted to the heat generating resistance layer may also be employed.

[Other Embodiments]

Embodiments according to the present invention are described specifically above, but the constitutions thereof are capable of being replaced with other known various constitutions within the scope of a concept of the present invention.

1) The image heating apparatus of the present invention is not limited to the use as the fixing device for heat-fixing the toner image, as a fixed image, carried on the sheet under heat and pressure as in the above-described embodiments. The image heating apparatus is also applicable to a glossiness adjusting apparatus (image modifying apparatus) for adjusting a surface property of an image by heating and pressing again the image (fixed or partly fixed image) once or temporarily fixed on the sheet to improve a glossiness of the image.

2) The type of the image forming portion of the image forming apparatus is not limited to the electrophotographic type, but may also be an electrostatic recording type or a magnetic recording type. For example, the image forming apparatus includes a copying machine, a printer (laser beam printer, LED printer or the like), a facsimile machine, a multi-function machine having a plurality of functions of these machines, a word processor and the like. Further, the type of the image forming apparatus is not limited to the transfer type, but may also be a type in which the image is formed on the sheet in a direct manner or a type in which an image is formed by an ink jet type and then is heat-dried and fixed.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 095193/2013 filed Apr. 30, 2013 and 027560/2014 filed Feb. 17, 2014, which are hereby incorporated by reference.

What is claimed is:

1. An endless belt unit for heating an image on a sheet, comprising:
   an electrode layer provided in a widthwise end side of said endless belt;
   a resistance layer provided so as to electrically connect with said electrode layer and configured to generate heat by the supply of electric power through said electrode layer;
   a first ring assembled in a widthwise end side of said endless belt and configured to electrically connect with said electrode layer;
   a second ring assembled so as to oppose said first ring through said electrode layer; and
   a fixing member configured to fix said first and second rings to each other so that said first and second rings are rotated integrally with said electrode layer.

2. An endless belt unit according to claim 1, wherein said fixing member includes a screw penetrating said electrode layer in a sandwiched state between said first and second rings.

3. An endless belt unit according to claim 1, wherein said fixing member includes a ring holding member configured to hold and fix said first and second rings.

4. An endless belt unit according to claim 3, wherein said ring holding member is provided with a tapered portion configured to fix said first and second rings.

5. An endless belt unit according to claim 1, wherein said first ring is disposed in close contact with said electrode layer.

6. An endless belt unit according to claim 1, wherein said first ring is formed of metal.

7. An endless belt unit according to claim 6, wherein said first ring is formed of copper.

8. An endless belt unit according to claim 1, wherein said second ring is provided with a slit at a part thereof with respect to a circumferential direction.

9. An endless belt unit according to claim 1, wherein said first ring is disposed at an outer surface side of said endless belt, and said second ring is disposed at an inner surface side of said endless belt.

10. An endless belt unit according to claim 1, further comprising a parting layer, provided on said resistance layer, configured to contact the sheet.

11. An endless belt unit according to claim 10, further comprising an elastic layer provided between said resistance layer and said parting layer.

12. An endless belt unit for heating an image on a sheet, comprising:
   an electrode layer provided in a widthwise end side of said endless belt;

a resistance layer provided so as to electrically connect with said electrode layer and configured to generate heat by the supply of electric power through said electrode layer;

a ring assembled in a widthwise end of said endless belt, said ring being provided with a bottom and a hollow portion into which the widthwise end of said endless belt is inserted so as to be electrically connected with said electrode layer; and a fixing member configured to fix said ring so that said ring is rotated integrally with said electrode layer.

13. An endless belt unit for heating an image on a sheet, comprising:

a first electrode layer provided in one widthwise end side of said endless belt;

a second electrode layer provided in the other widthwise end side of said endless belt;

a resistance layer provided so as to electrically connect with said first electrode layer and said second electrode layer and configured to generate heat by the supply of electric power through said first electrode layer;

a first ring assembled in the one widthwise end side of said endless belt and configured to electrically connect with said first electrode layer;

a second ring assembled so as to oppose said first ring through said first electrode layer;

a first fixing member configured to fix said first and second rings to each other so that said first and second rings are rotated integrally with said first electrode layer;

a third ring assembled in the other widthwise end side of said endless belt and configured to electrically connect with said second electrode layer;

a fourth ring assembled so as to oppose said third ring through said second electrode layer; and a second fixing member configured to fix said third and fourth rings to each other so that said third and fourth rings are rotated integrally with said second electrode layer.

14. An endless belt unit according to claim 13, wherein said first fixing member includes a screw penetrating said first electrode layer in a sandwiched state between said first and second rings, and said second fixing member includes a second screw penetrating said second electrode layer in a sandwiched state between said third and fourth rings.

15. An endless belt unit according to claim 13, wherein said first fixing member includes a first ring holding member configured to hold and fix said first and second rings, and said second fixing member includes a second ring holding member configured to hold and fix said third and fourth rings.

16. An endless belt unit according to claim 15, wherein said first ring holding member is provided with a tapered portion configured to fix said first and second rings, and said second ring holding member is provided with a tapered portion configured to fix said third and fourth rings.

17. An endless belt unit according to claim 13, wherein said first ring is disposed in close contact with said first electrode layer, and said third ring is disposed in close contact with said second electrode layer.

18. An endless belt unit according to claim 13, wherein each of said first and third rings is formed of metal.

19. An endless belt unit according to claim 18, wherein each of said first and third rings is formed of copper.

20. An endless belt unit according to claim 13, wherein each of said second and fourth rings is provided with a slit at a part thereof with respect to a circumferential direction.

21. An endless belt unit according to claim 13, wherein each of said first and third rings is disposed at an outer surface side of said endless belt, and each of said second and fourth rings is disposed at an inner surface side of said endless belt.

22. An endless belt unit according to claim 13, further comprising a parting layer, provided on said resistance layer, configured to contact the sheet.

23. An endless belt unit according to claim 22, further comprising an elastic layer provided between said resistance layer and said parting layer.

24. An endless belt unit for heating an image on a sheet, comprising:

a first electrode layer provided in one widthwise end side of said endless belt;

a second electrode layer provided in the other widthwise end side of said endless belt;

a resistance layer provided so as to electrically connect with said first electrode layer and said second electrode layer and configured to generate heat by the supply of electric power through said first electrode layer;

a first ring assembled in the widthwise end of said endless belt, said first ring being provided with a bottom and a hollow portion into which the one widthwise end of said endless belt is inserted so as to be electrically connected with said first electrode layer;

a first fixing member configured to fix said first ring so that said first ring is rotated integrally with said first electrode layer;

a second ring assembled in the other widthwise end of said endless belt, said second ring being provided with a bottom and a hollow portion into which the other widthwise end of said endless belt is inserted so as to be electrically connected with said second electrode layer; and a second fixing member configured to fix said second ring so that said second ring is rotated integrally with said second electrode layer.

25. An image heating apparatus comprising:

(i) an endless belt configured to heat an image on a sheet at a nip, said endless belt including:

(i-i) a first electrode layer provided in one widthwise end side of said endless belt;

(i-ii) a second electrode layer provided in the other widthwise end side of said endless belt;

(i-iii) a resistance layer provided so as to electrically connect with said first electrode layer and said second electrode layer and configured to heat by the supply of electric power through said first electrode layer;

(i-iv) a first ring assembled in a widthwise end side of said endless belt and configured to electrically connect with said first electrode layer;

(i-v) a second ring assembled so as to oppose-said first ring through said first electrode layer;

(i-vi) a first fixing member configured to fix said first and second rings to each other so that said first and second rings are rotated integrally with said first electrode layer;

(i-vii) a third ring assembled in the other widthwise end side of said endless belt so as to be electrically connected with said second electrode layer;

(i-viii) a fourth ring assembled so as to oppose said third ring through said second electrode layer;

(i-ix) a second fixing member configured to fix said third and fourth rings to each other so that said third and fourth rings are rotated integrally with said second electrode layer;

(ii) a first slidable member, provided slidably with said first ring, configured to effect electric power supply to said resistance layer via said first electrode layer;

(iii) a second slidable member, provided slidably with said third ring, configured to form an electric power supply path, via said resistance layer, between said first and second slidable members; and (iv) a rotatable driving member configured to form the nip in cooperation with said endless belt and configured to rotationally drive said endless belt.

26. An image heating apparatus according to claim 25, wherein said first fixing member includes a screw penetrating said first electrode layer in a sandwiched state between said first and second rings, and said second fixing member includes a second screw penetrating said second electrode layer in a sandwiched state between said third and fourth rings.

27. An image heating apparatus according to claim 25, wherein said first fixing member includes a first ring holding member configured to hold and fix said first and second rings, and said second fixing member includes a second ring holding member configured to hold and fix said third and fourth rings.

28. An image heating apparatus according to claim 27, wherein said first ring holding member is provided with a tapered portion configured to fix said first and second rings, and said second ring holding member is provided with a tapered portion configured to fix said third and fourth rings.

29. An image heating apparatus according to claim 25, wherein said first ring is disposed in close contact with said first electrode layer, and said third ring is disposed in close contact with said second electrode layer.

30. An image heating apparatus according to claim 25, wherein each of said first and third rings is formed of metal.

31. An image heating apparatus according to claim 30, wherein each of said first and third rings is formed of copper.

32. An image heating apparatus according to claim 25, wherein each of said second and fourth rings is provided with a slit at a part thereof with respect to a circumferential direction.

33. An image heating apparatus according to claim 25, wherein each of said first and third rings is disposed at an outer surface side of said endless belt, and each of said second and fourth rings is disposed at an inner surface side of said endless belt.

34. An image heating apparatus according to claim 25, further comprising:

a first limiting member, provided opposed to said endless belt with respect to the one widthwise end side of said endless belt, configured to limit movement of said endless belt toward the one widthwise end side; and a second limiting member, provided opposed to said endless belt with respect to the other widthwise end side of said endless belt, configured to limit movement of said endless belt toward the other widthwise end side, wherein said first limiting member is configured to abut against said first ring, and said second limiting member is configured to abut against said third ring.

35. An image heating apparatus according to claim 25, further comprising a parting layer, provided on said resistance layer, configured to contact the sheet.

36. An image heating apparatus according to claim 35, further comprising an elastic layer provided between said resistance layer and said parting layer.

37. An image heating apparatus comprising:

(i) an endless belt configured to heat an image on a sheet at a nip, said endless belt including:

(i-i) a first electrode layer provided in one widthwise end side of said endless belt;

(i-ii) a second electrode layer provided in the other widthwise end side of said endless belt;

(i-iii) a resistance layer provided so as to electrically connect with said first electrode layer and said second electrode layer and configured to generate heat by the supply of electric power through said first electrode layer;

(i-iv) a first ring assembled in the widthwise end of said endless belt, said first ring being provided with a bottom and a hollow portion into which the one widthwise end of said endless belt is inserted so as to be electrically connected with said first electrode layer;

(i-v) a first fixing member configured to fix said first ring so that said first ring is rotated integrally with said first electrode layer;

(i-vi) a second ring assembled in the other widthwise end of said endless belt, said first ring being provided with a bottom and a hollow portion into which the other widthwise end side of said endless belt is inserted so as to be electrically connected with said second electrode layer;

(i-vii) a second fixing member configured to fix said second ring so that said second ring is rotated integrally with said second electrode layer;

(ii) a first slidable member, provided slidably with said first ring, configured to effect electric power supply to said resistance layer via said first electrode layer;

(iii) a second slidable member, provided slidably with said second ring, configured to form an electric power supply path, via said resistance layer, between said first and second slidable members; and (iv) a rotatable driving member configured to form the nip in cooperation with said endless belt and configured to rotationally drive said endless belt.

* * * * *